United States Patent
Koponen et al.

(10) Patent No.: US 9,432,252 B2
(45) Date of Patent: Aug. 30, 2016

(54) UNIFIED REPLICATION MECHANISM FOR FAULT-TOLERANCE OF STATE

(71) Applicant: Nicira, Inc., Palo Alto, CA (US)

(72) Inventors: Teemu Koponen, San Francisco, CA (US); Alan Shieh, Menlo Park, CA (US); Igor Ganichev, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 193 days.

(21) Appl. No.: 14/231,543

(22) Filed: Mar. 31, 2014

(65) Prior Publication Data

US 2015/0009800 A1 Jan. 8, 2015

Related U.S. Application Data

(60) Provisional application No. 61/843,879, filed on Jul. 8, 2013.

(51) Int. Cl.
| | | |
|---|---|---|
| H04L 12/24 | (2006.01) | |
| G06F 11/20 | (2006.01) | |
| H04L 12/713 | (2013.01) | |
| H04L 12/703 | (2013.01) | |

(52) U.S. Cl.
CPC ....... *H04L 41/0695* (2013.01); *G06F 11/2005* (2013.01); *G06F 11/2038* (2013.01); *G06F 11/2097* (2013.01); *H04L 41/0668* (2013.01); *H04L 45/28* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 5,504,921 | A | 4/1996 | Dev et al. |
| 5,550,816 | A | 8/1996 | Hardwick et al. |
| 5,729,685 | A | 3/1998 | Chatwani et al. |
| 5,751,967 | A | 5/1998 | Raab et al. |
| 5,796,936 | A | 8/1998 | Watabe et al. |
| 5,805,791 | A | 9/1998 | Grossman et al. |
| 6,104,699 | A | 8/2000 | Holender et al. |
| 6,219,699 | B1 | 4/2001 | McCloghrie et al. |
| 6,512,745 | B1 | 1/2003 | Abe et al. |
| 6,539,432 | B1 | 3/2003 | Taguchi et al. |

(Continued)

FOREIGN PATENT DOCUMENTS

| | | |
|---|---|---|
| AU | 2012328699 | 4/2014 |
| EP | 1443423 | 8/2004 |

(Continued)

OTHER PUBLICATIONS

International Search Report and Written Opinion of PCT/US2014/045317, Nov. 14, 2014 (mailing date), Nicira, Inc.

(Continued)

*Primary Examiner* — Min Jung
(74) *Attorney, Agent, or Firm* — Adeli LLP

(57) ABSTRACT

A network control system that achieves high availability for forwarding state computation within a controller cluster by replicating different levels of table state between controllers of the controller cluster. To build a highly available controller cluster, the tables for storing the forwarding state are replicated across the controllers. In order to take responsibility for a slice, the slave controller of some embodiments performs merging of replicated state on a slice-by-slice basis. The merging is performed in a manner to prevent disruptions to the network state while the slave controller is updated.

20 Claims, 12 Drawing Sheets

(56) References Cited

U.S. PATENT DOCUMENTS

| | | |
|---|---|---|
| 6,680,934 B1 | 1/2004 | Cain |
| 6,768,740 B1 | 7/2004 | Perlman et al. |
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 2003/0093481 A1 | 5/2003 | Mitchell et al. |
| 2003/0142627 A1* | 7/2003 | Chiu ............. H04L 45/00 370/238 |
| 2004/0044773 A1 | 3/2004 | Bayus et al. |
| 2004/0047286 A1 | 3/2004 | Larsen et al. |
| 2004/0073659 A1 | 4/2004 | Rajsic et al. |
| 2004/0083403 A1* | 4/2004 | Khosravi ........ G06F 11/2038 714/13 |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0297428 A1 | 12/2007 | Bose et al. |
| 2008/0002579 A1 | 1/2008 | Lindholm et al. |
| 2008/0034249 A1 | 2/2008 | Husain et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0165704 A1 | 7/2008 | Marchetti et al. |
| 2009/0276661 A1 | 11/2009 | Deguchi et al. |
| 2009/0279549 A1 | 11/2009 | Ramanathan et al. |
| 2010/0002722 A1 | 1/2010 | Porat et al. |
| 2010/0058106 A1 | 3/2010 | Srinivasan et al. |
| 2010/0162036 A1 | 6/2010 | Linden et al. |
| 2010/0205479 A1 | 8/2010 | Akutsu et al. |
| 2011/0103259 A1 | 5/2011 | Aybay et al. |
| 2011/0134931 A1 | 6/2011 | Merwe et al. |
| 2011/0317559 A1 | 12/2011 | Kern et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2013/0010589 A1* | 1/2013 | Kini ............. H04L 45/50 370/219 |
| 2013/0044752 A1 | 2/2013 | Koponen et al. |
| 2013/0054761 A1 | 2/2013 | Kempf et al. |
| 2013/0058335 A1 | 3/2013 | Koponen et al. |
| 2013/0211549 A1 | 8/2013 | Thakkar et al. |
| 2013/0212205 A1* | 8/2013 | Flockhart ............ H04L 69/40 709/208 |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0329546 A1* | 12/2013 | Wijnands ............. H04L 45/16 370/218 |
| 2013/0332602 A1 | 12/2013 | Nakil et al. |
| 2013/0332619 A1 | 12/2013 | Xie et al. |
| 2014/0247753 A1 | 9/2014 | Koponen et al. |
| 2014/0348161 A1 | 11/2014 | Koponen et al. |
| 2014/0351432 A1 | 11/2014 | Koponen et al. |
| 2015/0009804 A1 | 1/2015 | Koponen et al. |
| 2015/0010012 A1* | 1/2015 | Koponen ........... H04L 41/0873 370/411 |

FOREIGN PATENT DOCUMENTS

| | | |
|---|---|---|
| EP | 2748990 | 7/2014 |
| GB | 2485866 | 5/2012 |
| WO | WO 2013/063332 | 5/2013 |
| WO | WO 2013/158917 | 10/2013 |
| WO | WO 2013/158918 | 10/2013 |
| WO | WO 2013/158920 | 10/2013 |
| WO | WO 2013/184846 | 12/2013 |
| WO | WO 2015/006143 | 1/2015 |

OTHER PUBLICATIONS

Author Unknown, "Private Network—Network Interface Specification Version 1.1 (PNNI 1.1)," The ATM Forum Technical Committee, Apr. 2002, 536 pages, The ATM Forum.

Author Unknown, "Virtual Machine Backup Guide," Nov. 2007, pp. 1-78, VMware, Inc., Palo Alto, California.

Belaramani, Nalini, et al., "PRACTI Replication," Proc. of NSDI, May 2006, 14 pages.

Casado, Martin, et al., "SANE: A Protection Architecture for Enterprise Networks," Proceedings of the 15th USENIX Security Symposium, Jul. 31, 2006, pp. 137-151.

Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.

Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.

Koponen, Teemu, et al., "Onix: A Distributed Control Platform for Large-scale Production Networks," In Proc. OSDI, Oct. 2010, pp. 1-14.

Krishnaswamy, Umesh, et al., "ONOS Open Network Operating System—An Experimental Open-Source Distributed SDN OS," Apr. 16, 2013, 4 pages.

(56) References Cited

OTHER PUBLICATIONS

Pankaj, Berde, et al., "ONOS Open Network Operating System An Open-Source Distributed SDN OS," Dec. 19, 2013, 34 pages.
Schneider, Fred B., "Implementing Fault-Tolerant Services Using the State Machine Approach: A Tutorial," ACM Computing Surveys, Dec. 1990, 21 pages, vol. 22, No. 4, ACM.
Stribling, Jeremy, et al., "Flexible, Wide-Area Storage for Distributed Systems with WheelFS," NSDI '09: 6$^{th}$ USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.

* cited by examiner

UNIFIED REPLICATION MECHANISM FOR FAULT-TOLERANCE OF STATE

CLAIM OF BENEFIT TO PRIOR APPLICATIONS

This application claims benefit to the U.S. Provisional Patent Application 61/843,879, filed Jul. 8, 2013, which is incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across different network configurations for multiple users.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. One of the challenges of large networks (including datacenters and enterprise networks) is maintaining and recomputing a consistent network state in the face of various failures in the network. For example, the failure of a network controller can create inconsistencies in the network state as the failed network controller is restarted or as a backup controller takes over the responsibilities of the failed network controller.

BRIEF SUMMARY

Some embodiments of the invention provide a model for the network controllers (also referred to as network controller instances or controllers) in which the controllers are implemented as a distributed database across a controller cluster. Controllers (or controller nodes) in the controller cluster manage the processing of packets by a set of forwarding elements (e.g., switches, routers, etc.) in a network control system. The forwarding elements manage the sending of packets between various physical and virtual elements (e.g., virtual machines (VMs), physical computing devices, etc.). The controller nodes in the controller cluster manage and compute state for the network control system. In some embodiments, network controllers of the network control system use a table-mapping engine (e.g., an nLog engine) to compute the forwarding states of the switching elements that the network controllers manage. This application refers to nLog engines and nLog tables for purposes of explanation. One of ordinary skill in the art will realize that the network controller of different embodiments employs different table-mapping engines.

While managing the network state for the switching elements, network controllers of the controller cluster may become unavailable for several different reasons. For example, a master controller may become unavailable when responsibilities of a controller are reassigned to different controllers. The responsibilities may be transferred away from an active master controller, but assigned to a new controller that is not yet prepared to handle the new assignments. This may temporarily leave no controller to manage the responsibilities until the new controller is prepared. In other cases, the hardware or software of a controller fails or needs to be upgraded, requiring a reboot of the controller, leaving the controller unavailable until the controller can restart and return to a current network state (i.e., a cold start). Alternatively, the controller might be a master (or primary) controller and has a backup (or standby) controller to take over its responsibilities when the controller fails or is rebooted (i.e., a failover). However, even with a backup controller, the backup controller may still not be prepared for a period of time if the backup controller is not updated with the state of the network right before the failure.

In the case of a cold start or failover, some embodiments of the invention quickly recompute the flow state of a previous network controller instance from various states stored by the particular network controller so that the wiring evaluation converges to the same flow state as the flow state of the previous network controller instance. However, when controller nodes in the controller cluster fail, depending on the nature and timing of the failure, the system may be unable to reach a correct state even after the state is recomputed (e.g., a flow entry is deleted, but the controller fails before a replacement flow is added). The network control system of some embodiments utilizes snapshots and a fixed-point mechanism to ensure that the network forwarding state remains consistent regardless of when a network controller fails. The fixed-point mechanism allows a particular network controller to ensure that it has a snapshot of a consistent state of the network from which to rebuild the network state for the particular network controller. However, in some cases, creating snapshots requires the network control system to reach a fixed-point and pause all processing while the snapshot is taken.

Some embodiments of the invention provide a method for the network control system that performs a continuous snapshotting to minimize downtime associated with reaching a single fixed-point and snapshotting the entire system. The method uses continuous snapshotting to continuously log evaluation events, maintaining a consistent state in the data plane without pausing the entire system.

While using continuous snapshotting ensures that the controllers can reach a correct network state and reduces downtime due to snapshotting, in some cases the network control system still becomes unavailable as it needs to recompute output state based on the snapshotted input state before it can resume operation. The recomputation on the controller may require a significant amount of processing resources or take a significant amount of time, negatively affecting the availability of the forwarding state computation. For example, a network controller, after either a cold start or failover, may need to recompute the state for the network control system from a set of inputs previously used to calculate the network forwarding state.

In order to more quickly converge to a proper network state, some embodiments of the invention provide a network control system that replicates different levels of the computed state between multiple controllers of the controller cluster. In some embodiments of the network control system, a managed switching element has both a master (or primary) controller and a slave (or standby) controller. The master controller manages a particular set of responsibilities. The set of responsibilities may include managing a logical datapath set (LDPS) or a physical forwarding element (PFE) on which a LDPS may be implemented. A LDPS may logically represent a switch or some other set of networking elements, which is then implemented through physical (or virtual) hardware.

In order to manage the set of responsibilities, the master and slave controllers of some embodiments maintain a set of forwarding state data that represents an evaluate state (or network state) of the network control system. The master controller processes a set of input tables to generate a combination of intermediate and output tables that represent the network state. In some embodiments, the master controller also receives configuration updates in an external configuration database in order to calculate forwarding state data for the network control system. The slave controller of some embodiments receives the same configuration database updates in order to compute the same set of forwarding state data based on the received updates.

The network control system of some embodiments replicates the whole evaluate state (e.g., the input, intermediate, and output tables) at the controllers, rather than only replicating the input state and having the controllers recompute intermediate and output tables to produce the output state. By replicating the whole evaluate state, the controllers require minimal recomputation, allowing the controllers to quickly converge to the correct network state. The convergence to the flow state under the reloading approach is bounded by the input/output (IO), not by the central processing unit (CPU) as it is under the recomputation approach. For example, in the case of a cold start, a controller instance may restart after a failure and reload the whole evaluate state, without needing to recompute the output tables. Reloading the whole evaluate state minimizes the need for recomputations and processor load on the controller.

The network control system of some embodiments stores the forwarding state (also referred to as network state, flow state or evaluate state) in database tables that are replicated across the controllers. In some embodiments, the amount of replication performed across the controllers is varied based on the requirements of the network. For example, in order to reduce network traffic between the controllers, only a particular set of input tables of the master controller are replicated to slave controllers, which then recompute the final output tables in order to maintain an accurate copy of the master controller's forwarding state in case of failovers. The slave controller is available on hot standby to take over the management of the set of responsibilities when the master controller fails. For hot standby, the slave controller of some embodiments has the same forwarding state, computed and readily available, as the forwarding state of the master controller.

However, this approach may require significant processing resources of the slave controller. Alternatively or conjunctively, the control system replicates the whole evaluate state to the slave controllers, ensuring that the slave controllers have the necessary input, intermediate, and output tables to quickly take over managing a set of responsibilities, without needing the slave controllers to constantly recompute the state. The input, intermediate, and output tables are stored until they are needed and recomputation of the state is only performed after the master controller fails. This, in turn, allows the slave controller to perform other operations (e.g., serving as a master controller for a different logical or physical switching element), which allows for smaller controller clusters.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
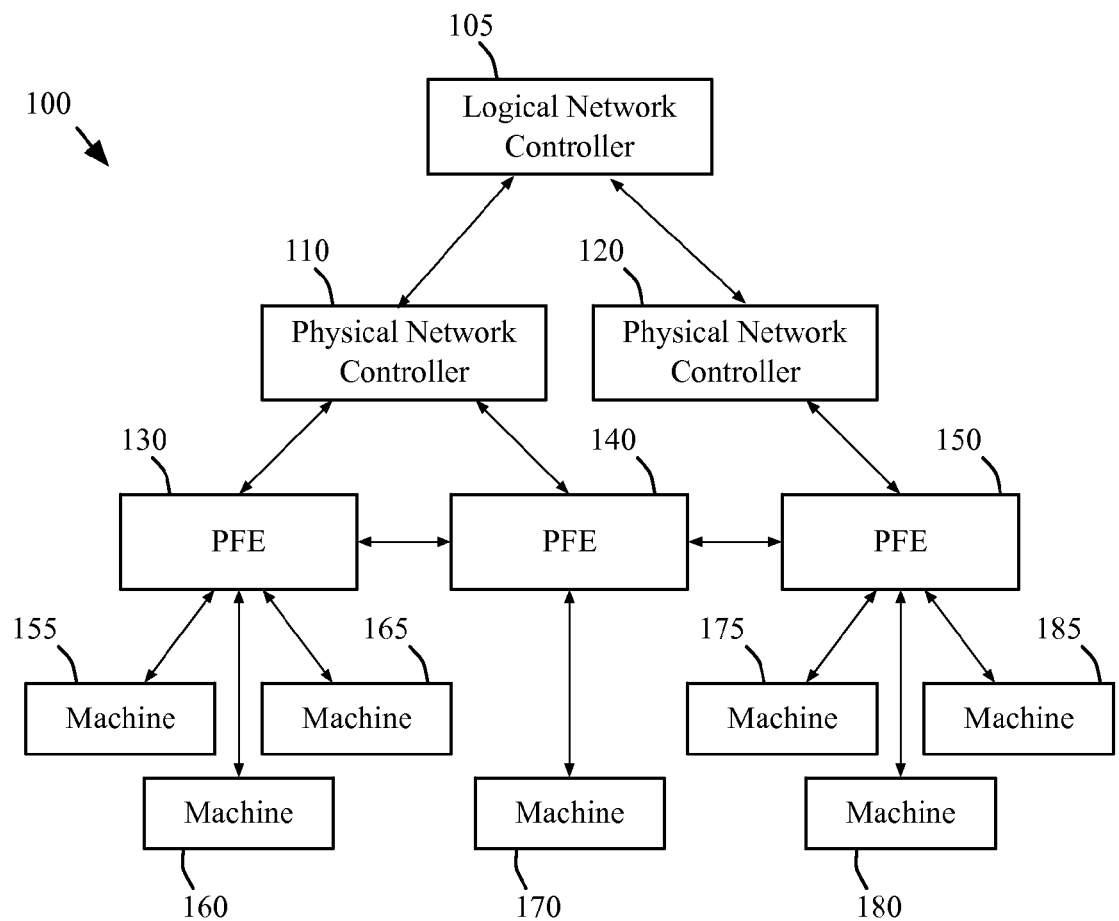
FIG. 1 conceptually illustrates an example architecture of a network control system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a model for the network controllers (also referred to as network controller instances or controllers) in which the controllers are implemented as a distributed database across a controller cluster. Controllers (or controller nodes) in the controller cluster manage the processing of packets by a set of forwarding elements (e.g., switches, routers, etc.) in a network control system. The forwarding elements manage the sending of packets between various physical and virtual elements (e.g., virtual machines (VMs), physical computing devices, etc.). The controller nodes in the controller cluster manage and compute state for the network control system. In some embodiments, network controllers of the network control system use a table-mapping engine (e.g., an nLog engine) to compute the forwarding states of the switching elements that the network controllers manage. This application refers to nLog engines and nLog tables for purposes of explanation. One of ordinary skill in the art will realize that the network controller of different embodiments employs different table-mapping engines.

While managing the network state for the switching elements, network controllers of the controller cluster may become unavailable for several different reasons. For example, a master controller may become unavailable when responsibilities of a controller are reassigned to different controllers. The responsibilities may be transferred away from an active master controller, but assigned to a new controller that is not yet prepared to handle the new assignments. This may temporarily leave no controller to manage the responsibilities until the new controller is prepared. In other cases, the hardware or software of a controller fails or needs to be upgraded, requiring a reboot of the controller, leaving the controller unavailable until the controller can restart and return to a current network state (i.e., a cold start). Alternatively, the controller might be a master (or primary) controller and has a backup (or standby) controller to take over its responsibilities when the controller fails or is rebooted (i.e., a failover). However, even with a backup controller, the backup controller may still not be prepared for a period of time if the backup controller is not updated with the state of the network right before the failure.

In the case of a cold start or failover, some embodiments of the invention quickly recompute the flow state of a previous network controller instance from various state stored by the particular network controller so that the wiring evaluation converges to the same flow state as the flow state of the previous network controller instance. However, when controller nodes in the controller cluster fail, depending on the nature and timing of the failure, the system may be unable to reach a correct state even after the state is recomputed (e.g., a flow entry is deleted, but the controller fails before a replacement flow is added). The network control system of some embodiments utilizes snapshots and a fixed-point mechanism to ensure that the network forwarding state remains consistent regardless of when a network controller fails. The fixed-point mechanism allows a particular network controller to ensure that it has a snapshot of a consistent state of the network from which to rebuild the network state for the particular network controller. However, in some cases, creating snapshots requires the network control system to reach a fixed-point and pause all processing while the snapshot is taken.

Some embodiments of the invention provide a method for the network control system that performs a continuous snapshotting to minimize downtime associated with reaching a single fixed-point and snapshotting the entire system. The method uses continuous snapshotting to continuously log evaluation events, maintaining a consistent state in the data plane without pausing the entire system.

Even though continuous snapshotting ensures that the controllers can reach a correct network state and reduces downtime due to snapshotting, the network control system may still become unavailable for other reasons. For example, in some cases, the network control system needs to recompute output state based on a snapshotted input state before it can resume operation. The recomputation on the controller may require a significant amount of processing resources or take a significant amount of time, negatively affecting the availability of the forwarding state computation. For example, a network controller, after either a cold start or failover, may need to recompute the state for the network control system from a set of inputs previously used to calculate the network forwarding state.

In order to more quickly converge to a good network state, some embodiments of the invention provide a network control system that replicates different levels of the computed state between multiple controllers of the controller cluster. In some embodiments of the network control system, a managed switching element has both a master (or primary) controller and a slave (or standby) controller. The master controller manages a particular set of responsibilities. The set of responsibilities may include managing a logical datapath set (LDPS) or a physical forwarding element (PFE) on which a LDPS may be implemented. A LDPS may logically represent a switch or some other set of networking elements, which is then implemented through physical (or virtual) hardware.

In order to manage the set of responsibilities, the master and slave controllers of some embodiments maintain a set of forwarding state data that represents an evaluate state (or network state) of the network control system. The master controller processes a set of input tables to generate a combination of intermediate and output tables that represent the network state. In some embodiments, the master controller also receives configuration updates in an external configuration database in order to calculate forwarding state data for the network control system. The slave controller of some embodiments receives the same configuration database updates in order to compute the same set of forwarding state data based on the received updates.

The network control system of some embodiments replicates the whole evaluate state (e.g., the input, intermediate, and output tables) at the controllers, rather than only replicating the input state and having the controllers recompute intermediate and output tables to produce the output state. By replicating the whole evaluate state, the controllers require minimal recomputation, allowing the controllers to quickly converge to the correct network state. The convergence to the flow state under the reloading approach is bounded by the input/output (10), not by the central processing unit (CPU) as it is under the recomputation approach. For example, in the case of a cold start, a controller instance may restart after a failure and reload the whole evaluate state, without needing to recompute the output tables. Reloading the whole evaluate state minimizes the need for recomputations and processor load on the controller.

The network control system of some embodiments stores the forwarding state (also referred to as network state, flow state or evaluate state) in database tables that are replicated across the controllers. In some embodiments, the amount of replication performed across the controllers is varied based on the requirements of the network. For example, in order to reduce network traffic between the controllers, only a particular set of input tables are replicated to slave controllers, which then recompute the final output tables in order to maintain an accurate copy of the master controller's forwarding state for possible failover. The slave controller is available on hot standby to take over the management of the set of responsibilities when the master controller fails. For hot standby, the slave controller of some embodiments has the same forwarding state computed and readily available as the forwarding state of the master controller.

However, this approach may require significant processing resources of the slave controller. Alternatively or conjunctively, the control system replicates the whole evaluate state to the slave controllers, ensuring that the slave controllers have the necessary input, intermediate, and output tables to quickly take over managing a set of responsibilities, without needing the slave controllers to constantly recompute the state. The input, intermediate, and output tables are stored until they are needed and recomputation of the state is only performed after the master controller fails. This, in turn, allows the slave controller to perform other operations (e.g., serving as a master controller for a different logical or physical switching element), which allows for smaller controller clusters.

Details and examples of replicating and restoring state to provide a fault tolerant network control system are described below. Specifically, Section II describes the process for replicating the data in greater detail. Section III then describes the process for restoring the data in the case of a failover or cold start. Finally, Section IV describes the computer systems and processes used to implement some embodiments of the invention. However, before describing these additional examples, the environment in which some embodiments of the invention are implemented will be described below in Section I.

I. Network Control System

A. Environment

The following section will describe the environment in which some embodiments of the invention are implemented. In some embodiments, the network control system includes a set of managed physical forwarding elements (PFEs) and a controller cluster for implementing logical datapath sets (LDPSs) (or logical forwarding elements (LFEs)) for multiple, different users on the PFEs. PFEs may also be referred to as managed switching elements (MSEs) in this application.

The controller cluster is made up of one or more controllers. The controllers of the controller cluster allow the system to accept configurations for the LDPSs from the users and to configure PFEs to implement the LDPSs. The controller cluster allows the network control system to virtualize control of the shared PFEs and the logical networks that are defined by the connections between the shared PFEs. The virtualized control prevents the different users from viewing or controlling each other's LDPSs and logical networks while sharing the same managed PFEs. Examples of such network control systems are described in U.S. Patent Publications 2013/0058356, 2013/0058228, and 2013/0103817. These publications are incorporated herein by reference.

FIG. 1 conceptually illustrates an example architecture of a network control system 100. In particular, this figure illustrates a network hierarchy with different elements of the network control system. As shown, the network control system 100 includes a logical controller 105, physical controllers 110 and 120, and three PFEs 130, 140, and 150. This figure also illustrates seven machines 155-185 that are connected to the PFEs 130, 140, and 150 to exchange data between them. One of ordinary skill in the art will recognize that many other different combinations of the controllers, forwarding elements, and machines are possible for the network control system 100.

The network control system of some embodiments includes different controllers to perform different tasks. In some such embodiments, the network control system includes different groups of controllers, with each group having different types of responsibilities. In the example of FIG. 1, the network control system includes two types of controllers, logical controller 105 and physical controllers 110 and 120, with different responsibilities. In some embodiments, the logical controller 105 is responsible for a particular LDPS (not shown), generating physical control plane data for managing physical forwarding elements based on user inputs for the LDPS. The logical controller 105 of some embodiments generates logical control plane (LCP) data based on user inputs. A control module (not shown) of the logical controller 105 then uses the generated LCP data to generate logical forwarding plane (LFP) data. A virtualization module (not shown) of the logical controller 105 generates universal physical control plane (UPCP) data from the LFP data.

Once the logical controller 105 has generated the physical control plane data, the logical controller 105 identifies the master physical controllers of the PFEs that implement the LDPS. In this example, the logical controller 105 identifies the physical controllers 110 and 120 because the PFEs 130, 140, and 150 are configured to implement the LDPS. The logical controller 105 sends the generated UPCP data to the physical controllers 110 and 120.

Each of the physical controllers 110 and 120 can be a master of one or more PFEs. In this example, the physical controller 110 is the master of two PFEs 130 and 140 and the physical controller 120 is the master of the PFE 150. As the master of a set of PFEs, the physical controllers of some embodiments generate, from the received UPCP data, customized physical control plane (CPCP) data specific for each of the PFEs. Therefore, in this example, the physical controller 110 generates the physical control plane data customized for each of the PFEs 130 and 140. The physical controller 120 generates physical control plane data customized for the PFE 150. The physical controllers 110 and 120 send the CPCP data to the PFEs 130, 140, and 150 of which the controllers are masters. In some embodiments, multiple physical controllers can be the masters of the same PFEs. The controllers of the network control system in some embodiments use a protocol, such as Openflow, to communicate with the PFEs.

In addition to sending CPCP data to the PFEs, the physical controllers of some embodiments receive data from the PFEs. For instance, a physical controller receives configuration information (e.g., identifiers of virtual interfaces (VIFs)) of the PFEs. The physical controller maintains the configuration information and also sends the information up to the logical controllers so that the logical controllers have the configuration information of the PFEs in order to implement the LDPSs for which the logical controllers are masters. In some embodiments, the configuration information is stored in a separate configuration database.

Each of the PFEs 130, 140, and 150 generates physical forwarding plane (PFP) data from the CPCP data received from the physical controllers 110 and 120. The PFP data defines the forwarding behavior of the PFE. In other words, the PFE populates its forwarding table with PFP data using the CPCP data. The PFEs 130, 140, and 150 forward packets among the host machines 155-185 according to the populated forwarding tables.

The architecture 100 described in FIG. 1 is only one example of a network control system. It should be apparent to one skilled in the art that the invention is not limited to the described network control system. In some embodiments, the roles performed by the different layers of the network control system may vary. In addition, some embodiments of the network control system may include more or fewer layers of processing. For example, in some embodiments, the network control system includes a chassis controller that processes data from the physical controllers before passing it to the forwarding elements.

B. Distributed Controller Cluster

As described above, the network control system of some embodiments includes a controller cluster with several controllers for managing the network control system. In some such embodiments, the network control system includes different groups of controllers, with each group having different types of responsibilities (e.g., logical and physical controllers). Some embodiments implement the different groups of controllers as a controller cluster in a dynamic set of physical servers, in which controllers can be dynamically added or removed from the cluster. Thus, as the size of the deployment increases, or when a particular controller or physical server on which a controller is operating fails, the cluster and responsibilities within the cluster are redistributed among the remaining active controllers.

In order to manage the redistribution of responsibilities, the controllers in the cluster of some embodiments run a consensus algorithm to determine a leader controller. The leader controller partitions the tasks for which each controller instance in the cluster is responsible by assigning a master controller for a particular work item, and in some cases a hot-standby controller to take over in case the master controller fails. Different methods for replicating data between the master and slave controllers in order to implement a hot-standby controller are described below in Section II.

Figure 2:
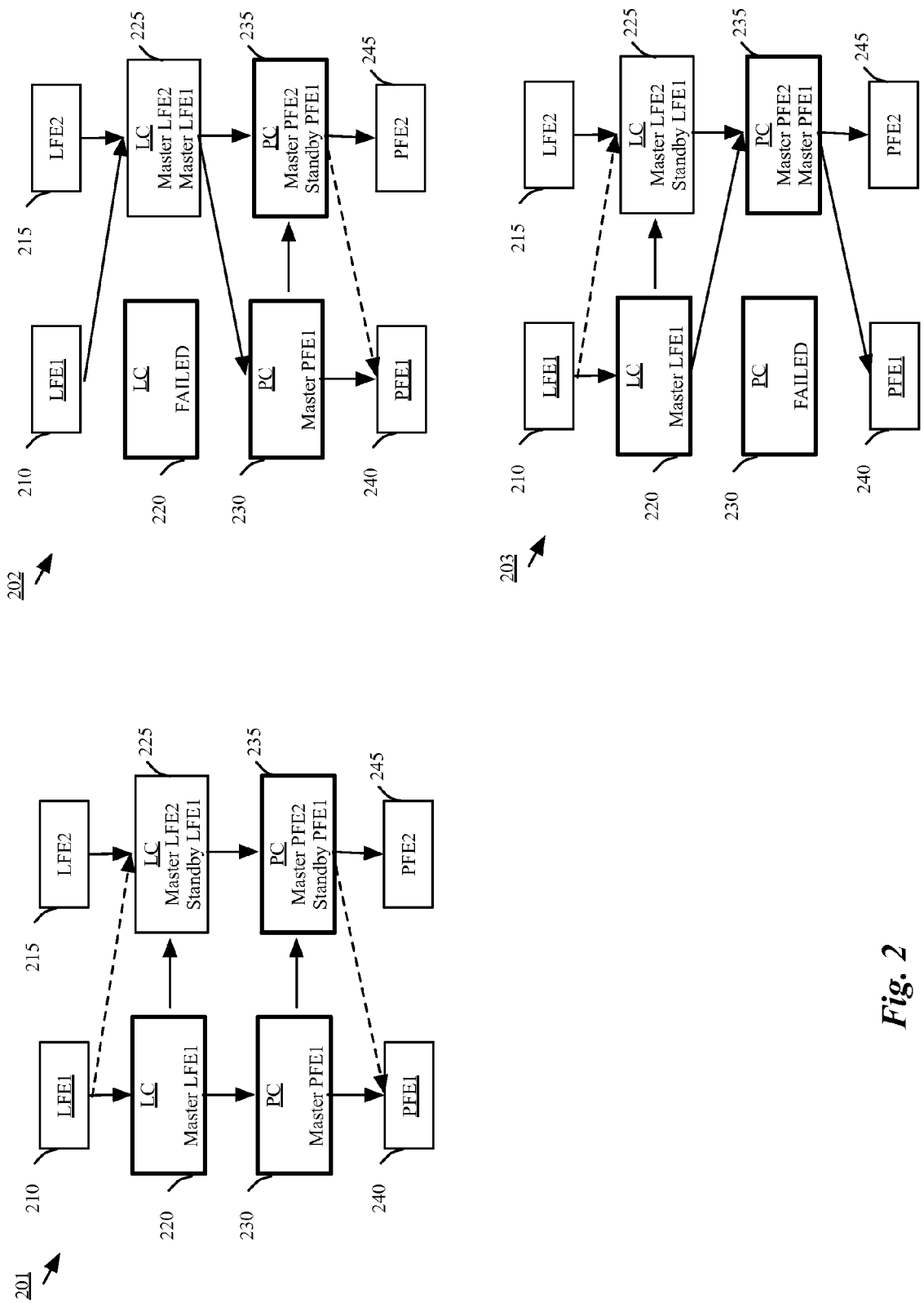
FIG. 2 illustrates an example of a distributed controller cluster that uses master and slave controllers to provide fault tolerant state and state computation in the network control system.

FIG. 2 illustrates an example of a distributed controller cluster that uses master and slave controllers to provide fault tolerant state and state computation in the network control system. The distributed controller cluster provides redundancy and resiliency for the network control system to provide a fault tolerant control system. This figure illustrates logical forwarding elements (LFEs) 210 and 215, logical controllers 220 and 225, physical controllers 230 and 235, and physical forwarding elements (PFEs) 240 and 245.

LFEs 210 and 215 are logical forwarding elements defined according to the requirements of a user in the system. LFEs 210 and 215 are not actual forwarding elements that forward packets, but rather a representation of a forwarding element for a user that is to be implemented on a set of shared physical network resources, such as PFEs in a multi-tenant datacenter. In order to implement the LFEs 210 and 215, the configurations for the LFEs are passed to the logical controllers 220 and 225.

As described above, the logical controllers 220 and 225 use the LCP data to generate LFP data to implement LFEs 210 and 215 respectively. In some embodiments, each logical controller is a master for a set of LFEs. In this example, logical controller 220 is a master controller for LFE1 210 and logical controller 225 is a master controller for LFE2 215. In this example, logical controller 225 also serves as a slave, or secondary, controller for logical controller 220 to manage LFE1 210. As described above, in some embodiments a controller may serve as a master for a particular set of responsibilities while also serving as a slave controller for another set of responsibilities.

The first scenario 201 illustrates a network control system that is functioning properly. The information for LFE1 210 is sent to the master logical controller 220. The information for LFE1 210 is also replicated on the slave logical controller 225, in order to provide a backup in case the master logical controller 220 fails. The logical controller 220 processes the information for LFE1 210 and generates logical state information that it sends to physical controller 230. Physical controller 230 processes the information that it receives from logical controller 220 to generate physical state data for PFE1 240. PFE1 240 uses the generated physical state data to generate forwarding instructions on PFE1 240 to implement LFE1 210. The information for PFE1 240 is also replicated on the slave physical controller 235, in order to provide a backup in case the master physical controller 230 fails.

Although shown with a single component at each level, one skilled in the art will understand that each component at each level may represent multiple components. For example, in some embodiments, the logical controller 220 communicates with several physical controllers, and each of the several physical controllers communicates with multiple PFEs to implement LFE1 210.

The second scenario 202 illustrates an example in which the master logical controller 220 for LFE1 210 has failed. Because the state data for LFE1 210 has been replicated on the slave logical controller 225, the slave logical controller 225 is able to quickly recover from the failure of the master logical controller 220. Depending on the amount of replication performed, the slave logical controller may either be immediately available to process further changes to the network state, or may be unavailable for some time, in order to regenerate the necessary state for LFE1 210. Logical controller 225 then serves as the master for both LFE1 210 and LFE2 215, sending the state information for the LFEs 210 and 215 to the physical controllers 230 and 235. In some embodiments, logical controller 225 remains as the master controller for LFEs 210 and 215 until either logical controller 220 can recover from the failure, or until the controller cluster elects a new master controller for LFE 210. The physical controllers 230 and 235 then send the state information to PFE1 240 and PFE2 245 to implement LFE1 210 and LFE2 215 respectively.

The third scenario 203 illustrates an example where the master physical controller 230 has failed. In this example, each of the physical controllers 230 and 235 serves as a master for PFEs 240 and 245 respectively. Similar to the second scenario 202, data has been replicated on the slave physical controller 235 and the slave physical controller 235 is able to quickly recover from the failure of the master physical controller 230. After the failover, the master logical controller 220, which used to send state data to the failed physical controller 230, propagates the state data to the new master physical controller 235. Physical controller 235 serves as the master for both PFEs 240 and 245, sending the necessary state information to both PFEs 240 and 245. As with the new logical controller 225, physical controller 235 of some embodiments remains a master for the PFEs 240 and 245 until the failed controller 230 recovers or until the controller cluster elects a new master controller for one of the PFEs.

In the examples above, the master controller at different levels of the network control system failed. In the case where only a slave controller fails, the computation of state for the slave's responsibilities is unaffected, but the controller cluster of some embodiments will perform an election process to elect a new slave controller. The master controller will then replicate the necessary information to the new slave controller to update the state of the new controller.

In the example of FIG. 2, LFE 210 is managed by a single logical controller 220. Logical controller 220 communicates with a single physical controller 230, which communicates with a single PFE 240. The controllers 220 and 230 each have a single standby controller 225 and 235 respectively. The simplified system of FIG. 2 is used as an example of the different master and standby controllers used to implement LFEs on a set of PFEs, and is not intended to limit the invention in any way. It is anticipated that such a system would use a single controller to perform multiple roles, or use several controllers for each of the roles. It is also anticipated that such a system may be implemented with a different number of levels of controllers in the system hierarchy (e.g., with an additional level of chassis controllers between the physical controllers and the PFEs).

As described above, each controller uses a set of inputs to generate new outputs that can be propagated to other controllers. The controller cluster of some embodiments is dynamic, with different controllers performing different functions at different times. In some embodiments, a failed controller is rebooted and serves a different role or has different responsibilities. For example, a master controller that fails and needs to be restarted, may transition to become a slave controller when it rejoins the controller cluster. However, when a controller is a new controller (e.g., newly booted, assigned to new responsibilities), the controller may not have the necessary inputs to generate the necessary network state.

Figure 3:
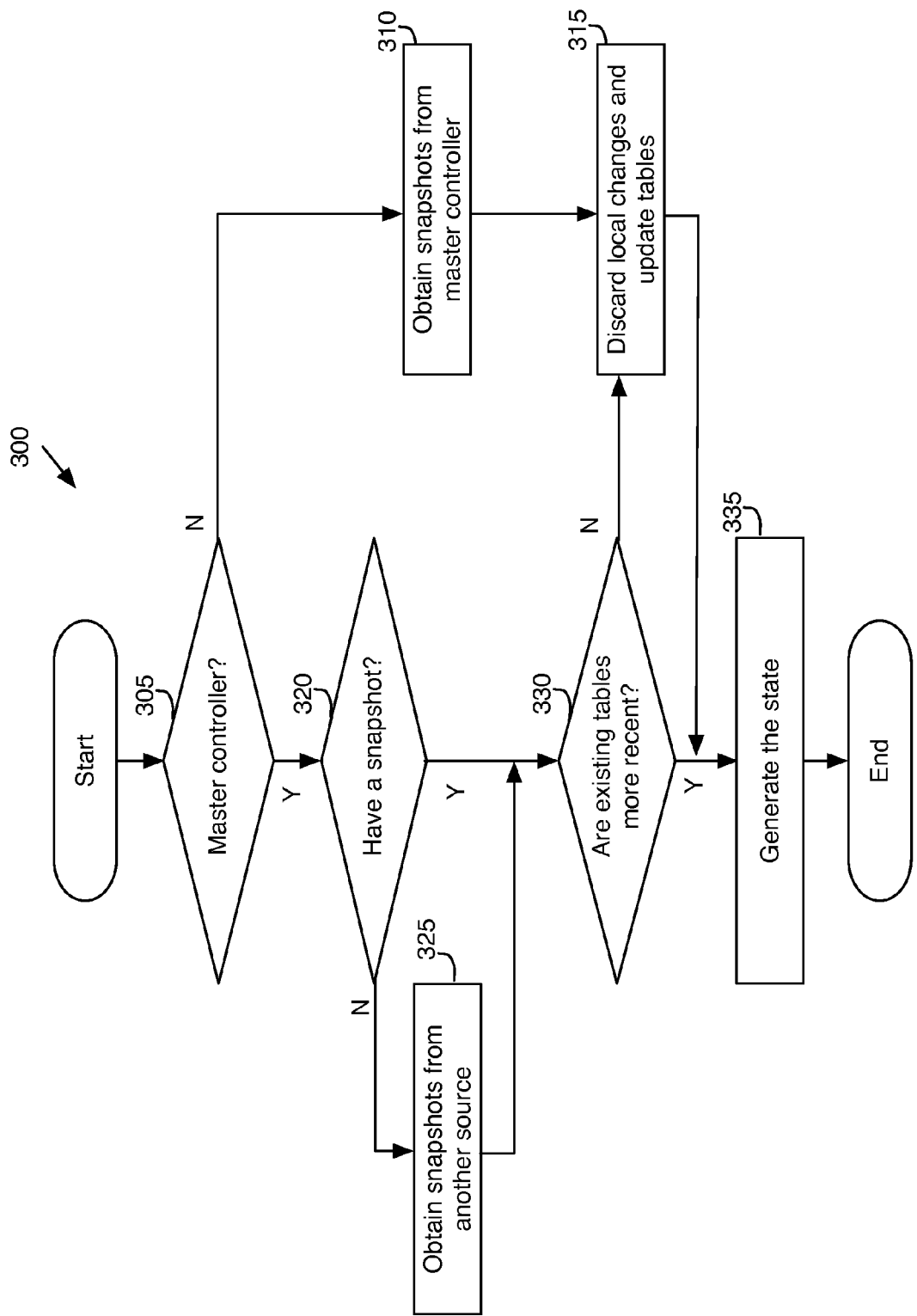
FIG. 3 conceptually illustrates a process for setting up the network state on a new node in a controller cluster based on an existing snapshot.

FIG. 3 conceptually illustrates a process 300 for setting up the network state on a new node in a controller cluster based on an existing snapshot. The process 300 is performed in some embodiments by the new node when it is assigned responsibilities in the controller cluster. The new node may be a restarted controller, or just a new node that is being added to the system.

The process 300 determines (at 305) whether the new node is a master network controller or a slave network controller. When the new node is not a master, the process 300 obtains (at 310) snapshots from the master controller. In some embodiments, the external coordination mechanism identifies a master controller for each slave controller. Once the slave controller has obtained the snapshots, the process 300 discards (at 315) local changes and updates the tables based on the snapshots. In this case, because the slave controller has just obtained the snapshots from the master controller, the snapshots provide the most updated version of the state. In some embodiments, the slave node operates in a read-only mode. The process 300 then continues on to step 335 to generate the state.

When the process 300 determines (at 305) that the new node is the master network controller, the process determines (at 320) whether the controller has a logged version of the snapshot in a local memory. When the process 300 determines (at 320) that the controller does not have such a snapshot, the process obtains (at 325) the table snapshot from a source based on instructions from the external coordination mechanism. For example, the process may retrieve the table snapshot from the previous master controller. In some embodiments, backup snapshots are stored at multiple different controllers in the system and the process retrieves the table snapshot from one of the other controllers.

The external coordination mechanism of some embodiments may either query the different controllers to find a particular snapshot or keep a record of the different nodes storing the particular snapshot. When the process determines that the new node possesses a snapshot, the process determines (at 330) whether any existing tables are more recent than the snapshot.

When the process 300 determines (at 330) that the existing tables are not as recent as the snapshot, the process discards (at 315) the local changes and updates the tables based on the snapshots. Once the tables on the new node reflect the most recent known state of the controller, the process 300 generates (at 335) the state.

C. Network Controller Architecture

Figure 4:
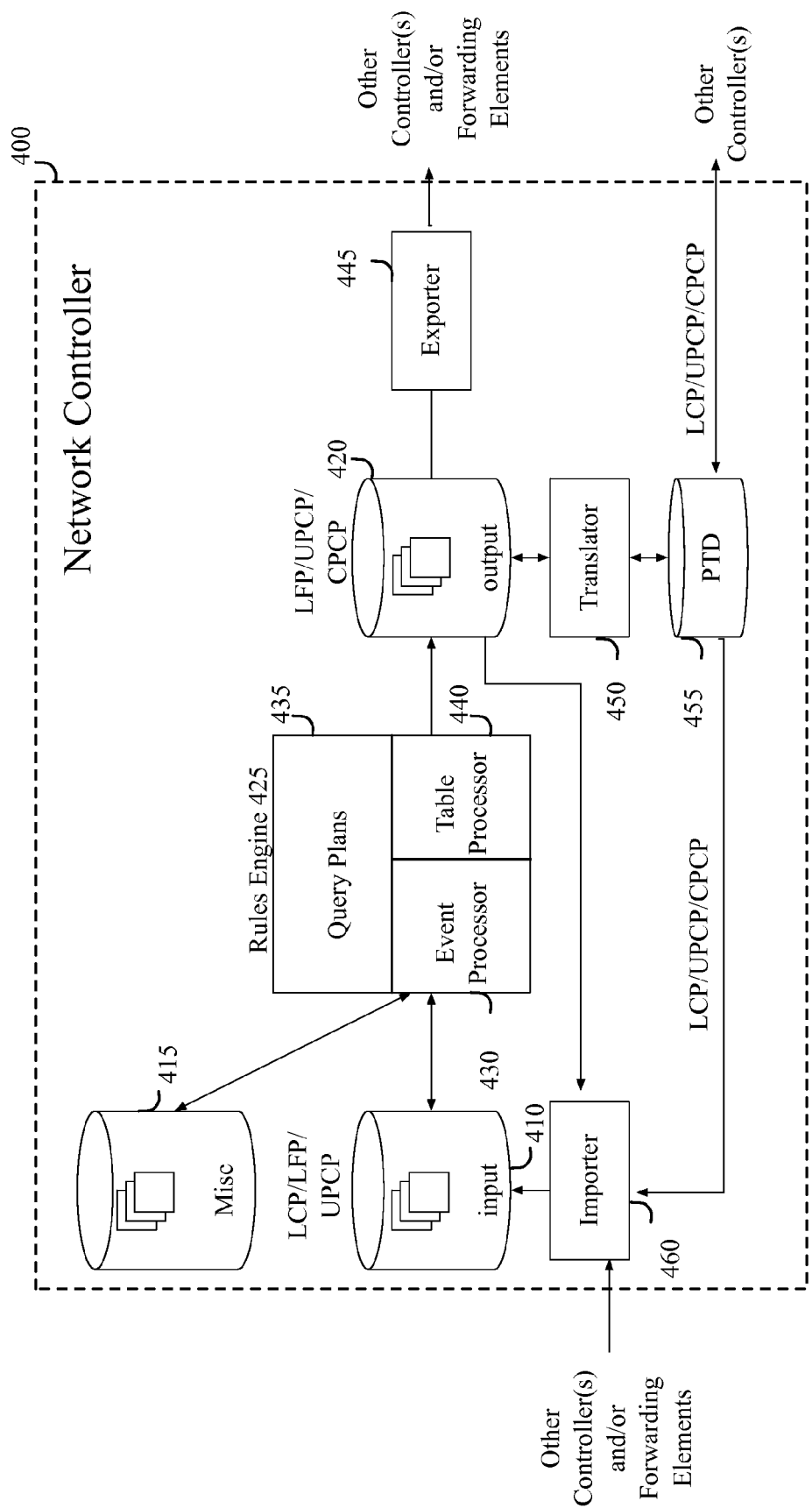
FIG. 4 illustrates an example architecture of a network controller (e.g., a logical controller or a physical controller).

As described above, each of the controllers in a controller cluster may perform different duties with different responsibilities. FIG. 4 illustrates an example architecture of a network controller 400 (e.g., a logical controller or a physical controller). The network controllers receive inputs related to a set of responsibilities of the network controller to generate outputs that reflect the results of the inputs. The network controller of some embodiments uses a table-mapping engine to map data from an input set of tables to data in an output set of tables. The network controller 400, as shown, includes input tables 410, miscellaneous tables 415, a rules engine 425, output tables 420, an importer 460, an exporter 445, a translator 450, and a persistent data storage (PTD) 455.

The input tables 410 of some embodiments store information regarding the logical forwarding element configurations (e.g., access control list table configurations, L2 table configurations, L3 table configurations, etc.) that the user defines without referencing any operational state of the switching elements in a particular network configuration. In some embodiments, the input tables 410 are populated based on input received from a user. The input tables 410 may also receive inputs from other processes or modules running in the network control system. For example, the input tables 410 may also receive updates due to workload operational changes that result in a change to the forwarding state. For instance, when a virtual machine migrates from a first node to a second node, the logical view remains unchanged. However, the forwarding state requires updating due to the migration, as the logical port to which a VM attaches is now at a different physical location. Also, physical reconfiguration events, such as managed forwarding element additions, removals, upgrades and reconfiguration, may result in changes to the forwarding state. The input tables of some embodiments include changes to the LDPSs as well as changes to the physical elements (e.g., a forwarding element) on which the logical elements are implemented.

In some embodiments, the input tables 410 include tables with different types of data depending on the role of the controller 400 in the network control system. For instance, in some embodiments the input set of tables 410 in a controller includes logical control plane (LCP) data to be mapped to logical forwarding plane (LFP) data or LFP data to be mapped to universal physical control plane (UPCP) data when the controller 400 is a logical controller, while the input set of tables 410 include UPCP data to be mapped to customized physical control plane (CPCP) data when the controller is a physical controller.

In addition to the input tables 410, the network controller 400 includes other miscellaneous tables 415 that the rules engine 425 uses to gather inputs for its table-mapping operations. These miscellaneous tables of some embodiments include constant tables that store defined values for constants that the rules engine 425 needs to perform its table-mapping operations (e.g., the value 0, a dispatch port number for resubmits, etc.). The miscellaneous tables of some embodiments further include function tables that store functions that the rules engine 425 uses to calculate values to populate the output tables 420.

In addition, in some embodiments, the nLog engines also use data from a configuration database, or other database external to nLog, to generate output from the given inputs. The network controller of some embodiments provides internal tables (e.g., C++ backed tables) that store additional state beyond the table tuples of the nLog tables.

Like the input tables 410, the output tables 420 include tables with different types of data depending on the role of the controller 400. For example, when the controller 400 functions as a logical controller, the output tables 420 include LFP data and UPCP data, whereas when the controller 400 functions as a physical controller, the output tables 420 include CPCP data. The output tables 420 of some embodiments may also serve as input tables for other queries. The output tables 420 include head tables, or tables that contain the final results and are no longer changed until new inputs are received.

In some embodiments, the output tables 420 can be grouped into several different categories. For instance, in some embodiments, the output tables 420 can be rules engine (RE) input tables (i.e., intermediate tables) and/or RE output tables. An output table is an RE input table when a change in the output table causes the rules engine 425 to detect an input event that requires the execution of a query plan. An output table can also be an RE input table that generates an event that causes the rules engine to perform another query plan. An output table is an RE output table when a change in the output table causes the exporter 445 to export the change to another controller or a PFE. An output table can be an RE input table, an RE output table, or both an RE input table and an RE output table.

The rules engine 425 performs table-mapping operations that specify one manner for converting input data to output data. Whenever one of the input tables is modified (referred to as an input table event), the rules engine 425 performs a set of table-mapping operations that may result in the modification of one or more data tuples in one or more output tables.

In some embodiments, the rules engine 425 includes an event processor 430, a set of query plans 435, and a table processor 440. Each query plan is a set of rules that specifies a set of join operations that are to be performed upon the occurrence of an input table event. The event processor 430 of the rules engine 425 detects the occurrence of each such event. In some embodiments, the event processor 430 registers for callbacks with the input tables 410 for notification of changes to the records in the input tables 410, and detects an input table event by receiving a notification from an input table when one of its records has changed.

In response to a detected input table event, the event processor 430 (1) selects an appropriate query plan from the query plans 435 for the detected table event, and (2) directs the table processor 440 to execute the query plan. To execute the query plan, the table processor 440, in some embodiments, performs the join operations specified by the query plan to produce one or more records that represent one or more sets of data values from one or more input and miscellaneous tables 410 and 415. The table processor 440 of some embodiments then (1) performs a select operation to select a subset of the data values from the record(s) produced by the join operations, and (2) writes the selected subset of data values in one or more output tables 420.

Some embodiments designate the first join operation that is performed by the rules engine 425 for an input event to be based on an LDPS parameter. This designation ensures that the rules engine's join operations fail and terminate immediately when the rules engine has started a set of join operations that relate to a LDPS (i.e., to a logical network) that is not managed by the controller 400.

Some embodiments allow application developers to create the rules engine 425 for the controller using a variation of the datalog database language referred to herein as nLog. nLog allows an application developer to specify the manner by which the controller maps logical datapath sets to the controlled physical switching infrastructure. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table-mapping rules engine that is referred to as the nLog engine.

Once the rules engine 425 produces the outputs to the output tables 420, the exporter 445 detects the changes to the output tables 420 and propagates the changes to the next level of the hierarchy (i.e., another controller or a PFE). In some embodiments, the exporter 445 registers for callbacks with the output tables 420 for notification of changes to the records of the output tables 420. In such embodiments, the exporter 445 detects an output table event when it receives notification from an output table that one of the records in the output table has changed.

The exporter 445 then takes each modified data tuple in the modified RE output tables and propagates this modified data tuple to one or more other controllers or to one or more PFEs. When sending the output table records to another controller, the exporter 445 in some embodiments uses a single channel of communication (e.g., an RPC channel) to send the data contained in the records. When sending the output table records to PFEs, the exporter in some embodiments uses two channels. One channel is established using a switch control protocol (e.g., OpenFlow) for writing flow entries in the control plane of the PFE. The other channel is established using a database communication protocol (e.g., JSON) to send configuration data (e.g., port configuration, tunnel information).

In some embodiments, the exporter 445 uses transactions to ensure that the propagated data maintains a consistent state. The exporter 445 may wait to detect a barrier in the outputs before propagating the data to the next level of the hierarchy (i.e., another controller or a PFE) to ensure that only complete and consistent changes are propagated in the system. The use of transactions in maintaining a consistent state is described in further detail below.

In some embodiments, the controller 400 receives data for logical datapath sets that the controller is not responsible for managing (i.e., for logical networks managed by other logical controllers), but does not keep the data in the output tables 420. Rather, the data is translated by the translator 450 into a format that can be stored in the PTD 455 and is then stored in the PTD 455. In some embodiments, the PTD 455 propagates this data to PTDs of one or more other controllers so that the controllers that are responsible for managing the logical datapath sets can process the data. The controller 400 stores a copy of the data from the output tables 420 to the PTD 455 for resiliency of the data. Therefore, in these embodiments, a PTD 455 of a controller 400 has all the configuration data for all of the logical datapath sets managed by the network control system. That is, each PTD contains the global view of the configuration of the logical networks of all of the users. In some embodiments, the controller 400 uses the PTD 455 to replicate data in the controller cluster by sending table snapshots to other controllers (e.g., slave controllers).

The importer 460 interfaces with a number of different sources of input data and uses the input data to modify or create the input tables 410. The importer 460 of some embodiments receives the input data from another controller. The importer 460 also interfaces with the PTD 455 so that data received through the PTD from other controller instances can be translated and used as input data to modify or create the input tables 410. Moreover, the importer 460 also detects and processes changes in the RE input tables. Details of the network controller of some embodiments are described in U.S. Patent Publication 2013/0058228, filed Jul. 6, 2011 and published on Mar. 7, 2013. This publication is incorporated herein by reference.

II. Replicating Data in the Controller Cluster

In a network control system, failures may occur at various different points in the system. In some embodiments, when a controller fails, the network control system recovers from the failure by restarting the failed network controller when it is feasible to do so. In such embodiments, the failed controller node will use data that has been stored in a non-volatile memory of the node to return to the desired network state. In other cases, the network control system is able to provide fault tolerance for the controllers of the controller cluster through replication of the network state between master and slave controllers as described above. The network control system of some embodiments replicates data in the controller cluster to keep an updated version of the state on multiple controllers throughout the system in order to maintain a slave controller as a hot standby (or backup controller) that is able to quickly take over the responsibilities of the master controller.

Whether the network state is replicated to a non-volatile memory or to a set of secondary, slave controllers, the network control system replicates the data in order to provide a backup to the network forwarding state. The network control system of some embodiments provides several different methods of replicating data to a backup, allowing the system to maintain state and computations based on the needs and resources of the network control system.

A. Snapshotting and Logging

Some embodiments employ an approach where a snapshot of all the controller tables (also referred to as a table snapshot) is taken in order to provide for a quick restoration in the case of a controller failure. In some embodiments, in addition to the controller tables, the network controller also persists (via table logging code) the internal tables (e.g., C++ tables) that store the additional network state. In some such embodiments, each internal table provides an interface to effectively extract the internal table's state as a serializable string. The interface of some embodiments supports one or more of the following features:

1) A call to get a serialized update entry since the last call;
2) A call to extract the full snapshot in a serialized manner; and
3) Calls to feed a snapshot and any subsequent updates for the table to restore its state.

In order to ensure that the state across the snapshotted tables is consistent, the controllers of some embodiments take the snapshot after a defined point (also referred to as a fixed point) is reached. In some embodiments, a fixed point is reached when all of the pending input events have been processed and propagated through the controllers. In some embodiments, each time a change is made to the networking state, the changes are propagated to the next level of the hierarchy (i.e., another controller or a PFE).

The fixed point is necessary to ensure that the snapshot portrays a consistent and correct view of the network state. The controller may receive changes that should be processed together, such as instructions to add a new version of a record and removing the old version of the record. If a snapshot is taken before the second flow entry, but after the first flow entry, it would result in inconsistent state in the data plane. In order to avoid such inconsistent state, the system waits for a fixed point, where all pending instructions have been fully committed.

Once a fixed point is reached, further evaluation of the state is stopped (e.g., disabled) while the snapshot of all of the tables is taken, ensuring that the state is consistent across all of the tables. Although snapshotting all of the tables allows a controller to restore the snapshotted state without having to recalculate the state, it may also consume significant resources in the system to store all of the tables and copies of the tables in multiple controllers of the controller cluster. In addition, stopping further evaluation of the state during the snapshotting process prevents the system from processing updates to the state in a timely manner.

In order to avoid the stoppage of the evaluation that otherwise occurs during snapshotting, the network controller of some embodiments continuously (or at defined intervals) logs the evaluation events. In some embodiments, all the controller tables are persisted when utilizing the continuous logging approach. For any table receiving an event, the network controller logs updates to the table by storing a version of the table along with a log for recording the changes, or input events, of the table. The network controller replicates the whole table to a slave controller to avoid replaying the whole log to reach the current state. Such periodic storing of the table reduces the overhead of applying the log.

The logged event may trigger additional queries in a query plan. The network controller of some embodiments removes the event from a table buffer only after the queries depending on the event have logged the events into table buffers. When the input events are provided in a single transaction, a single log entry is added to the log. In some embodiments, in order to maintain a good state throughout the system, the network control system uses transactions to propagate changes through the system. The transactions allow the system to ensure that partial changes (such as the removal of an old entry without the addition of the replacement entry) do not occur. By using transactions throughout the system, the system ensures that snapshots are correct and that the controllers are able to reach the desired state based on the snapshot.

The controllers of some embodiments use an external coordination mechanism to commit the results of their evaluations as transactions. For instance, when the external coordination mechanism of some embodiments reaches a fixed point, the external coordinator performs the commit by sending a signal to release the results to an external data sink (e.g., a controller lower in the hierarchy). In some such embodiments, the commits are recorded in the log.

Figure 5:
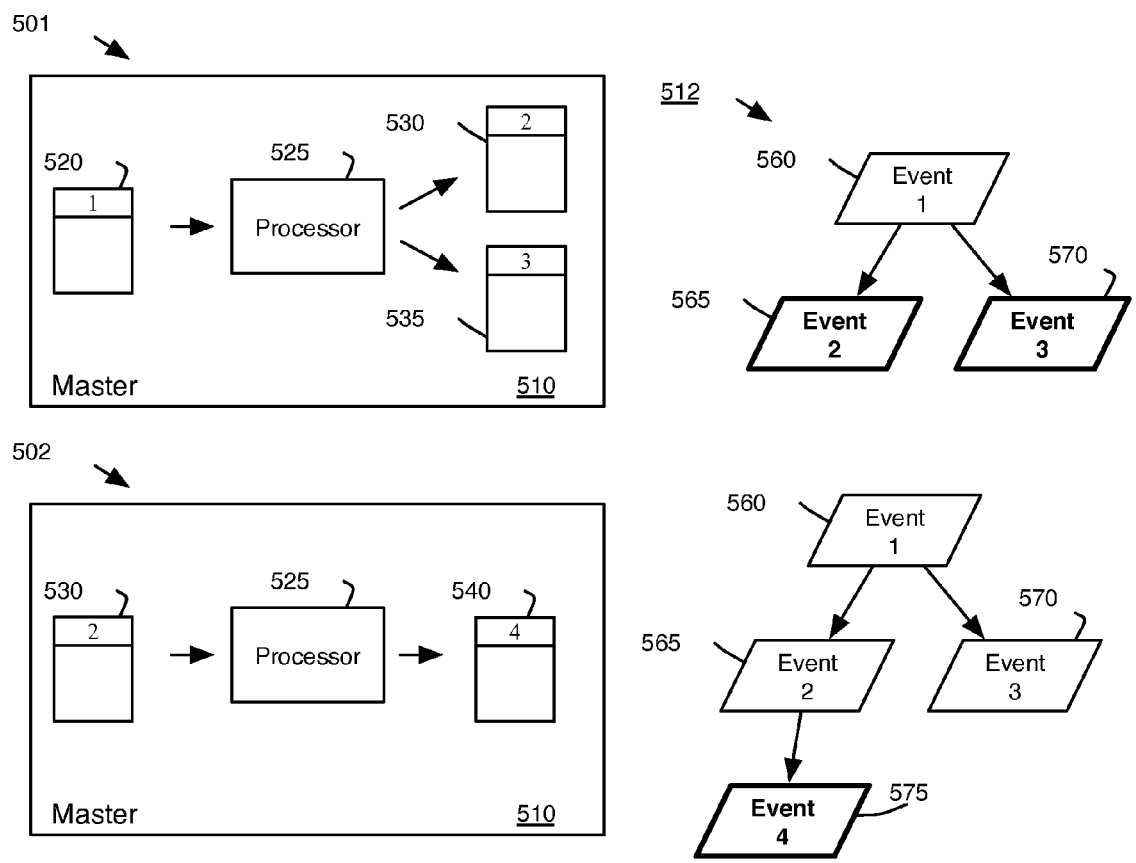
FIG. 5 illustrates an example of event logging in a network controller.

FIG. 5 illustrates an example in four stages 501-504 of event logging in a network controller. This example is described with reference to nLog, but it should be obvious to one skilled in the art that other methods may be used. In some embodiments, the nLog language does not provide recursion.

The first stage 501 illustrates a network controller 510 on the left and a visualization of a log 512 on the right. The controller 510 is similar to the controllers described above with reference to FIG. 4. In the first stage 501, input table 520 contains a single Record 1, that is reflected in the log 512 as log entry 560. When the event is provided to the nLog runtime of some embodiments for processing, the event propagates through a hierarchy of declarations until it is processed and the computation has converged. An input event triggers a query plan that specifies a set of join operations that are to be performed upon the occurrence of the input table event. The query plan may create additional RE input table events that trigger additional query plans, adding additional levels to the hierarchy. In this example, Record 1 is processed by processor 525 to generate Records 2 and 3 in output tables 530 and 535 respectively.

The updates to tables 530 and 535 are represented in the hierarchical log 512 as log entries 565 and 570. The network controller schedules the updates starting at the highest part of the hierarchy, such that the processor 525 evaluates the updates higher in the hierarchy before propagating the changes to the lower levels of the hierarchy. In some of these embodiments, the network controller 510 logs the updates to the tables in the same order in which the network controller updates the tables to ensure that the logged updates are performed in the same order. Using this technique, the network controller of some embodiments gives preference to the tables higher in the hierarchy and discards updates to tables that are lower in the hierarchy because the network controller can recompute updates to the lower level tables from the higher level tables.

In the second stage 502, output table 530 now serves as an input table. As described above, output tables for a particular query may serve as input tables for another query. In this example, the change or addition to Record 2 triggers another query in the processor 525 (or rules engine) that affects Record 4 of output table 540. The update to Record 4 is reflected in the log as event 575. No further events are triggered in this example. The log 512 now shows log entry 560 for the initial input event, as well as log entries 565, 570, and 575 based on events triggered by the initial input event.

Some embodiments provide a journaling feature for the database for logging changes. Journaling allows the database to ensure data integrity by tracking changes to be made to the database. Then, when the system is restored after a failure, the system executes any remaining changes from the journal that are not reflected in the database. In some such embodiments, the journaled database tables need to be higher in the evaluation tree to ensure that the tables are logged.

In some embodiments where the nLog evaluation engine is transactional, the journaling is integrated into the evaluation transactions. For instance, after a request has been processed, a "commit" is issued. The "commit" blocks modifications to the database tables until the critical input tables requiring persistence have been replicated to the other nodes.

B. Different Levels of Replication

The network control system of some embodiments replicates the network state to the slave controllers by logging various controller tables on the controllers and sending the logged tables to the slave controllers. In order to trade-off between the cost of logging and evaluation when reconstructing the state after restoring, some embodiments persist a defined number of tables to make the logging cheaper and restoring more expensive. In some such embodiments, two types of tables are used: (1) logged tables and (2) unlogged tables. Logged tables get their updates recorded to the local disk and are not recomputed while restoring. Unlogged tables are recomputed once the controller restarts in some embodiments. These different types of tables allow the system to provide different levels of replication based on system resources and requirements.

The network control system of some embodiments achieves high availability for forwarding state computation with the controller cluster using different levels of replication for the controller table state. In some embodiments, the high availability mechanisms are outside of the nLog engine. For instance, the network control system of some embodiments runs the same computation on multiple nLog controllers by providing each of them with the same input data. In some embodiments, the network control system does not use mechanisms external to the nLog engine for the nLog computations, but rather provide new properties within nLog for replicating the nLog tables across the controllers. Implementing the replication of the forwarding state through nLog tables allows for fine-grained trade-offs between computational cost and network bandwidth utilization. The network control system of different embodiments uses different approaches to replicate data (e.g., the network state stored in the input/output tables and pending events for those tables) in a master/slave controller pair.

Figure 6:
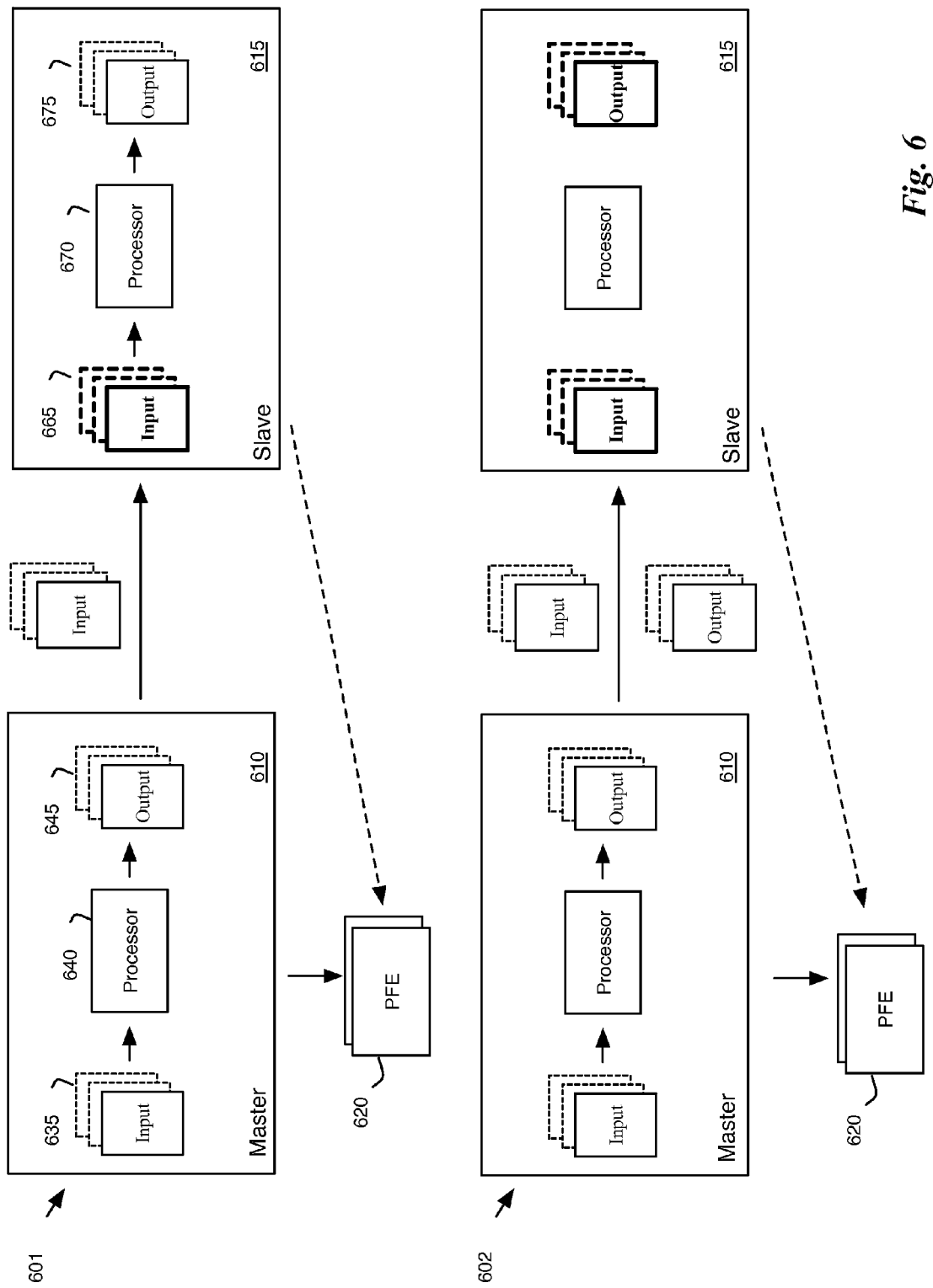
FIG. 6 illustrates an example of replicating different amounts of information across a master and slave controller in order to provide fault tolerance of state.

FIG. 6 illustrates an example of replicating different amounts of information across a master and slave controller in order to provide fault tolerance of state. The different levels of replication may be determined based on the costs of bandwidth and the availability of computational resources in the system. This figure illustrates a master controller 610 and a slave controller 615 for physical forwarding element 620. The master controller 610 includes input tables 635, a processor 640, and output tables 645. The slave controller 615 includes input tables 665, a processor 670, and output tables 675. The components of the master controller 610 and slave controller 615 are described in further detail above with reference to FIG. 4.

The first scenario 601 illustrates a first example of replicating in the system. The master controller 610 processes input tables 635 with the processor 640 to generate output tables 645. As described above, the input tables 635 may be populated with different types of information that affect the network control system. As the master controller 610 receives updates to the state of the system, it sends copies of the input tables 645 to the slave controller 615. The input changes should be relatively small, limiting the drain on network bandwidth.

Since only the input tables 635 are being replicated, the slave controller 615 is responsible for performing all of the necessary calculations to generate output that matches the output tables 645 of the master controller 610. The input tables 635 of the master controller 610 are replicated to the input tables 665 of the slave controller 615. The processor 670 of the slave controller 615 then performs the same operations as the processor 640 of the master controller 610 to generate matching output tables 675. This requires significant processing resources on the slave controller 615.

The second scenario 602 illustrates a second example of replicating performed by the system. Similar to the first scenario 601, the master controller 610 performs all of the necessary calculations to generate the output tables 645 and update the state of the system. However, unlike the previous scenario, in the second scenario 602, the master controller 610 replicates both the input tables 635 and the calculated output tables 645 to the slave controller 615. By replicating the entire set of input, intermediate, and output tables, the master controller 610 will generate more network traffic. However, because the slave controller 615 no longer needs to process the input tables 665 to generate the output tables 675, the slave controller 615 no longer requires the same level of processing resources as in the first scenario 601. The network control system of some embodiments adjusts the amount of replication used in the system based on resources available in the system.

Figure 7:
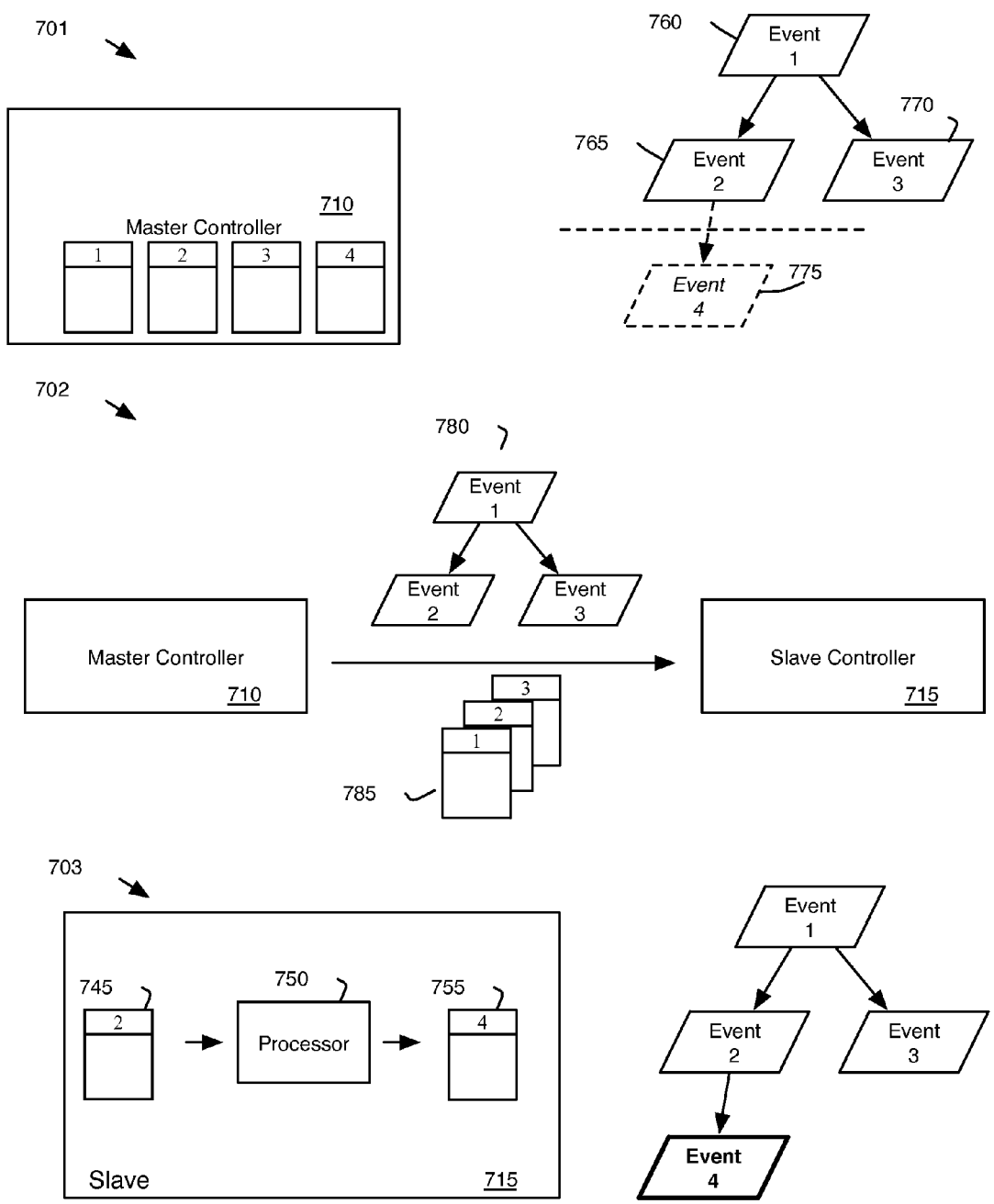
FIG. 7 illustrates in three stages 701-703 an example of replicating fewer tables based on pruning decisions at the network controller.

For example, the network controller of some embodiments varies the amount of replication performed based on resources of the controller. FIG. 7 illustrates in three stages 701-703 an example of replicating fewer tables based on pruning decisions at the network controller. As described above with reference to FIG. 5, the updates to the tables form a hierarchy of updates, or an evaluation result tree. The network controller of some embodiments serializes the evaluation result tree to any extent that resources are available to perform the serialization in a timely manner. The evaluation trees are then pruned, beginning at the bottom of the evaluation result tree, to reduce the space required for logging.

The first stage 701 illustrates an example of pruning an evaluation result tree. Similar to the first stage 501 of FIG. 5, the first stage 701 illustrates a master controller 710 on the left and a visualization of a log 780 on the right. In some embodiments, if the total space dedicated for the evaluation result trees increases past a threshold amount of space set for queuing the updates to be transmitted to other nodes (e.g., network controllers), the network controller prunes the evaluation result trees. The network controller of some embodiments starts from the leaves of the evaluation result trees when pruning the evaluation result trees. Such pruning reduces the number of tables that need to be replicated in the system. In this example, the master controller 710 prunes a leaf record, Record 4 775, from the log. As described above with reference to FIG. 5, Record 4 775 is triggered by Record 2 765.

The second stage 702 illustrates a master controller 710 and a slave controller 715 similar to the network controllers described above with reference to FIG. 6. In the second stage 702, the master controller 710 replicates tables 785 and a pruned log 780 to the slave controller 715. Since Event 4 775 was pruned from the log 780, the master controller 710 no longer needs to replicate the table corresponding to Event 4 in the set of tables 785. Rather, the corresponding table on the slave controller can be updated or created based on the events of the upper levels of the evaluation result tree.

The third stage 703 illustrates that the slave controller 715 recomputes any necessary events based on the received tables and logs. In this example, Record 2 in table 745 triggers an event to modify Record 4 in table 755.

By replicating more of the input/output tables and reducing the level of processing resources required on the slave controllers, the network control system of different embodiments is able to use cheaper slave controllers or to reduce the size of the controller cluster in environments where network bandwidth is plentiful. In some embodiments, since the slave controller now has free processing resources that can be used for other functions (e.g., generating state for a different set of forwarding elements), the slave controller for a particular set of entities (e.g., a set of forwarding elements, a set of lower level controllers, etc.) uses the majority of its processing resources to serve as a master controller for a different set of such entities. In such embodiments, it is desirable to minimize the processing resources required by the slave controller in order to allow the slave controller to dedicate its processing resources to the forwarding elements for which it is the master controller.

In addition to minimizing the processing resources required by a slave controller, replicating the controller tables across master-server controller pairs allows the configuration state to be stored in the controller tables. In such a case, a slave controller no longer needs to duplicatively compute the configuration database state, further simplifying the requirements for the slave controller. Once the pending events are persisted along with the tables, the network controller of some embodiments no longer requires an external replicated database (e.g., a configuration database) to hold information about the configuration of the network to supplement the input tables of the nLog engine. Rather, in some embodiments, the snapshotted nLog evaluation effectively serves as a special-purpose replicated database. In some embodiments, a write to the database is effectively a request that accesses a special output table and modifies its internal state as well as one or more input tables that other tables are using as the saved configuration state.

Figure 8:
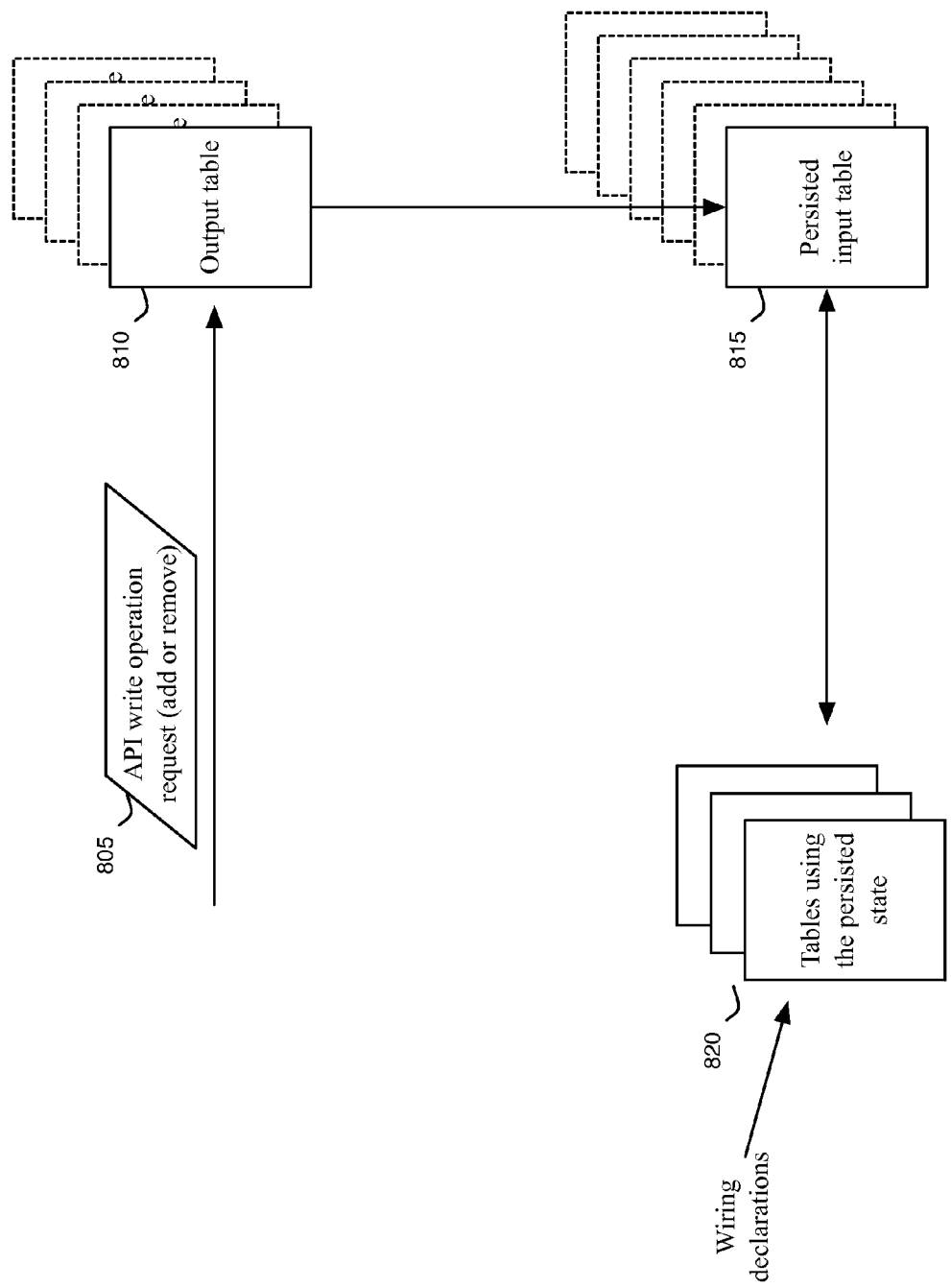
FIG. 8 illustrates an example of using changes to output tables to manage the existing state on a controller.

FIG. 8 illustrates an example of such a write operation to store configuration information as internal state in a set of tables. As shown, a write operation request 805 is provided through an application programming interface (API). The write operation request 805 makes a set of changes to an output table 810. The output tables 810 reflect the network state for a particular stage of the network control system. For this example, the change requested by the write operation request 805 modifies the internal state of the output. The modification to the internal state of the output tables is then propagated to a persisted input table. The persisted input table provides a view of the updated configuration state. The persisted input table 815 is used by a table mapping engine, in conjunction with other input tables 820, to generate output that properly reflects the updated configuration state. In this example, the other input tables 820 include a set of tables representing wiring declarations and other tables. In some embodiments, events that modify the internal state of the output are only sent to the master network controller. The master network controller of some embodiments then replicates the changes to the slave network controllers by sending the log of the changes to one or more slave network controllers.

III. Restoring State and Computations

In order to restore state in a network control system in which all of the tables are logged, it is simply a matter of restoring the logged tables from a saved snapshot. However, when only a portion of the tables are logged, some embodiments of the network control system restore the state of the controllers by recalculating at least a portion of the network state from the logged tables. Some embodiments of the network controller, restore the state from a log, replaying commits that were stored in the log. In this manner, the network controller uses the commits as the points when the evaluation reaches fixed points. In some embodiments, the network controller pushes the results further when the network controller reaches a fixed point.

Figure 9:
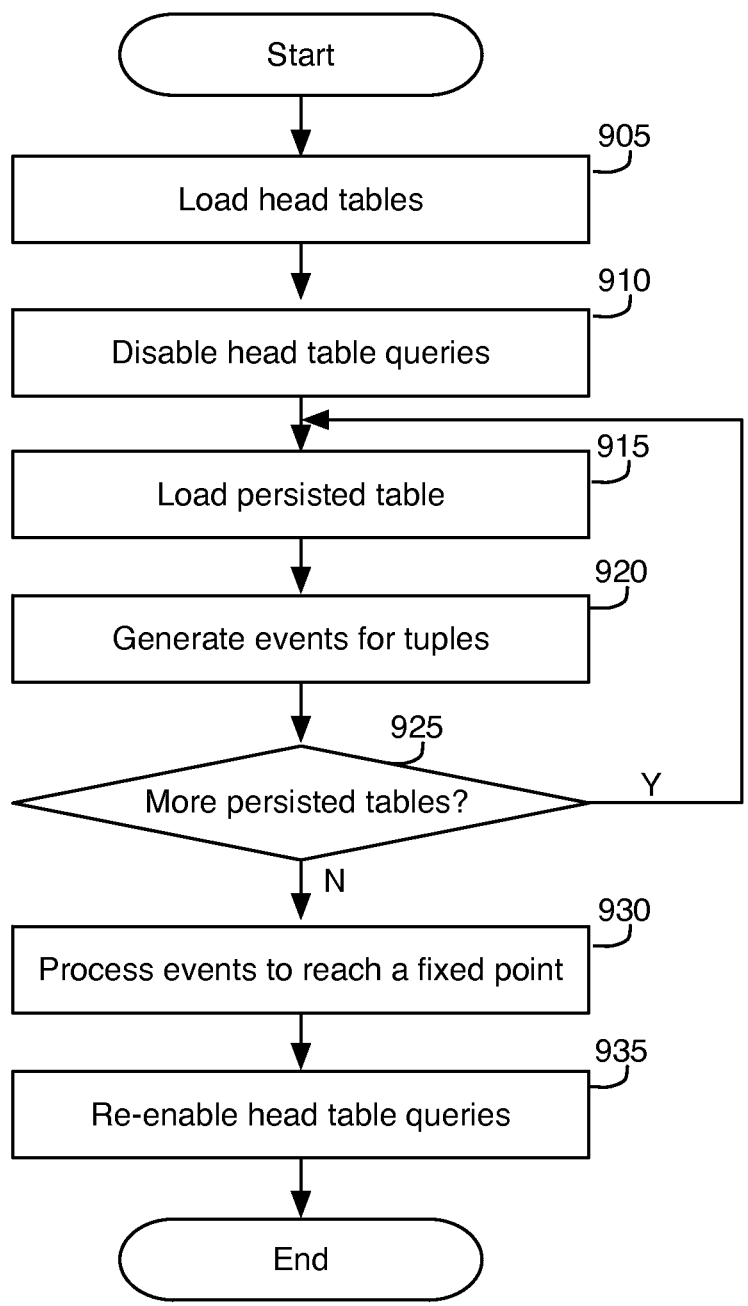
FIG. 9 conceptually illustrates a process for restoring logged tables at a controller.

FIG. 9 conceptually illustrates a process for restoring logged tables at a controller. The controller may be a controller that is restarting or a slave controller that is assuming the responsibilities of a master controller. The process 900 loads (at 905) head tables. Head tables, or the output tables, result from nLog queries and are often used to cause changes external to the nLog runtime. The head tables represent the network forwarding state. The head tables may be the tables that are already loaded in memory or may be snapshots of the head tables that are stored on the controller. As described above, snapshots are collected at fixed points during the processing to ensure that the snapshot contains a consistent view of the network state.

The process 900 then disables (at 910) queries to the head tables to ensure that the state stored in the head tables is not changed during the restore. In some embodiments, the head tables store forwarding rules for implementing LDPSs on PFEs. The queries are disabled to ensure that the state of the dataplane is not affected during the restore process. The process then loads (at 915) a persisted table and generates (at 920) events for tuples as the tuples of the persisted table are loaded in.

The process 900 then determines (at 925) whether there are more persisted tables to load. When there are more persisted tables, the process returns to step 915 and loads the next persisted table. When there are no more persisted tables, the process processes (at 930) the generated events to allow the computations to reach a fixed point. The computations need to reach a fixed point to ensure that changes that affect the data plane (i.e., changes that affect the way packets are actually forwarded in the network) are not made until the results from the loaded snapshot are completely processed. Finally, the process 900 enables (at 935) all the queries to allow the controller to begin calculating further changes to the state.

A. Partial Loading for Failover

Sending snapshots to a remote controller (i.e., a slave controller) allows the slave controller in some embodiments to keep up-to-date with the evaluation state. In some embodiments, the slave controller is a dedicated slave controller. When complete snapshots of the input, intermediate, and output tables are sent to a dedicated slave controller, the slave controller may remain largely idle, as the processing for the tables has already been performed. In some of these embodiments, the slave controller can simply replace existing tables with the updates sent from the master controller. In other embodiments, the slave controller may receive only a subset of the tables and actively update the state in parallel with the master controller. In this case, the slave controller performs the same operations as the master controller, with the exception of actually sending the output to the next level.

Figure 10:
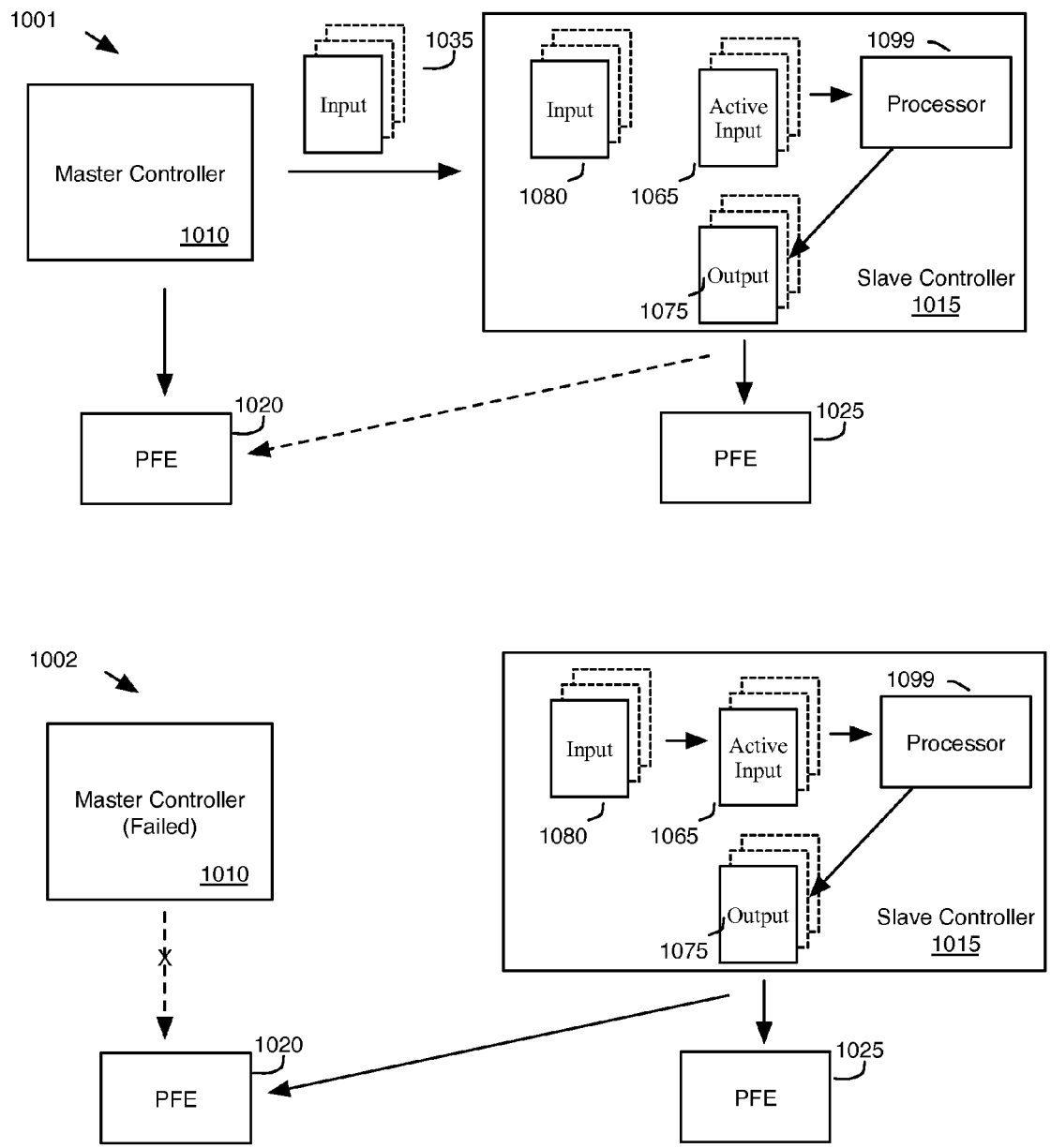
FIG. 10 illustrates an example of a master controller and a slave controller that also serves as a master for another slice.

However, the slave controller of some embodiments is also a master controller for managing a different set of slices and does not need to maintain the state in the active nLog tables. FIG. 10 illustrates an example of a slave controller that performs merging on a slice-by-slice basis to assume the responsibilities of another controller. In some embodiments, a slice is a subset of logical datapath sets. A snapshot of a slice in some such embodiments is a snapshot of the state of the subset of logical datapath sets. The slice of some embodiments is a subset of managed switching elements (e.g., physical managed switches). In some such embodiments, a snapshot of a slice is a snapshot of the state of the subset of managed switching elements.

Like FIG. 6, this figure illustrates a master controller 1010 and a slave controller 1015 for a PFE 1020. The slave controller 1015 also serves as a master controller for a second PFE 1025. The first stage 1001 shows that the input tables 1035 are being replicated to the slave controller 1015, but in order to conserve the resources of the slave controller, the replicated tables 1080 are not being actively managed by the slave controller and are not stored in the active input tables 1065. The active input tables 1065 are computing output tables 1075 by processor 1099. The outputs for the replicated input tables 1080 are not actively calculated by the slave controller.

In the second stage 1002, the master controller 1010 has failed and is no longer able to send updates to the PFE 1020. Because the slave controller 1015 is already processing state for another slice (i.e., PFE 1025), the slave controller 1015 cannot simply replace the input tables with the replicated input tables 1080 received from the master controller 1010. When the slave controller 1015 has detected the failure of the master controller 1010, the slave controller 1015 of some embodiments merges the inputs received from the master controller 1010 with the active input tables 1065 of the slave controller 1015. Therefore, in some embodiments, when the master controller 1010 fails, the slave controller 1015 merges the loaded snapshot 1080 (instead of performing a wholesale replacement of the evaluation state) with the other state(s) for the other slices that it is managing. In some embodiments, the merge is performed with each update received from the master controller 1010, while in other embodiments the merge is only performed when the master controller 1010 has failed and the slave controller 1015 is identified to manage the orphaned slices.

In some embodiments, once the slave controller 1015 merges the input tables 1080 into the active input tables 1065 in order to load the snapshot into a slice (e.g., a set of tables for storing the state of the slice), the slave controller 1015 computes the incremental differences resulting from the merge and feeds the changes to the processor 1099 to perform table-mapping operations (e.g., nLog computations) that update tuples in intermediate and output tables 1075 to update the slice state with the changes. The changes are then propagated down to the PFEs 1020 and 1025.

In some embodiments, in addition to the input tables, the slave controller 1015 also stores and merges snapshots of the intermediate tables (not shown) and/or the output tables (not shown) received from the master controller 1010. The slave controller 1015 computes the incremental differences, performs any necessary state calculations, and propagates those changes to the PFEs 1020 and 1025. As described above with reference to FIG. 9, all of the computations need to reach a fixed point to ensure that changes that affect the data plane (i.e., changes that affect the way packets are actually forwarded in the network) are not made until the snapshot is fully loaded and processed.

Figure 11:
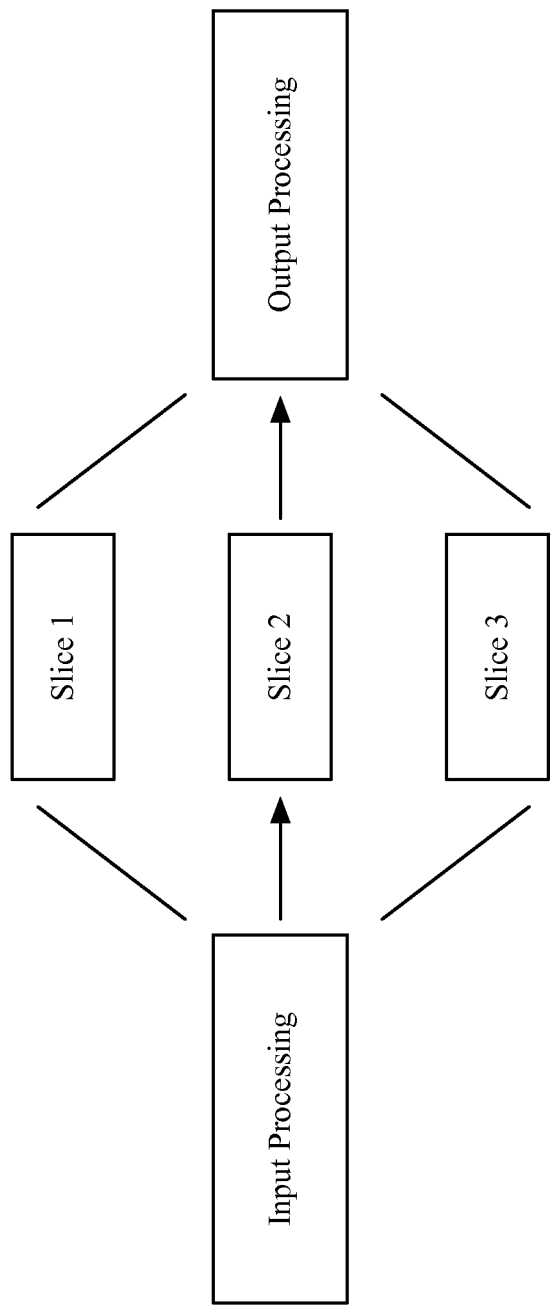
FIG. 11 illustrates an example of slice-by-slice processing to restore state on a controller.

FIG. 11 conceptually illustrates an example of how the computation is structured in this approach according to some embodiments of the invention. As shown, FIG. 11 illustrates an input processing module for managing input processing state, an output processing module for managing output processing state, and slices 1-3. In particular, FIG. 11 shows the input processing module and output processing module operating on slice 2 in order to merge the portion of a snapshot (not shown in FIG. 11) that corresponds to slice 2. As an example, the network controller of some embodiments loads the snapshot into slice 2, resolves differences between the snapshot and the input processing state, propagates the differences to the output processing state, and resolves differences between the snapshot and the output processing state.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
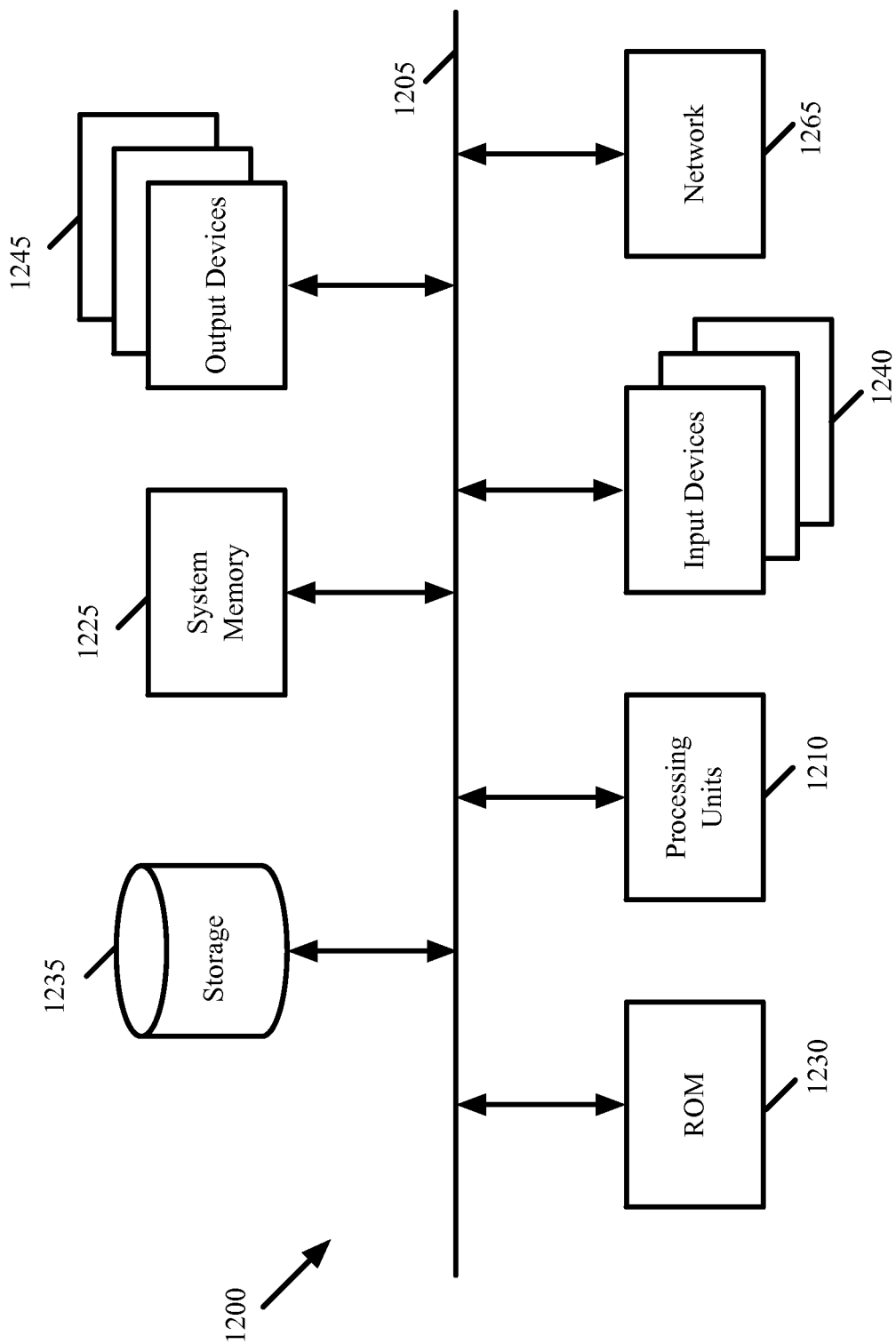
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1212.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1212. The input devices enable the user to communicate information and select commands to the electronic system. The input devices 1240 include alphanumeric keyboards and pointing devices (also called "cursor control devices"). The output devices 1212 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Also, several embodiments were described above in which a user provide logical datapath sets in terms of logical control plane data. In other embodiments, however, a user may provide logical datapath sets in terms of logical forwarding plane data. In addition, several embodiments were described above in which a controller instance provide physical control plane data to a switching element in order to manage the switching element. In other embodiments, however, the controller instance may provide the switching elements with physical forwarding plane data.

Furthermore, in several examples above, a user specifies one or more logic switches. In some embodiments, the user can provide physical switch configurations along with such logic switch configurations. Also, even though controller instances are described that in some embodiments are individually formed by several application layers that execute on one computing device, one of ordinary skill will realize that such instances are formed by dedicated computing devices or other machines in some embodiments that perform one or more layers of their operations. Thus, one of ordinary skill in the art would understand that the invention is not to be limited by the foregoing illustrative details. Thus, one of ordinary skill in the art would understand that the invention is not to be limited by the foregoing illustrative details.

What is claimed is:

1. For a first controller instance that manages a first set of forwarding elements implementing logical datapath sets of a network control system, a machine-readable medium storing a program executable by at least one processing unit of the first controller instance, the program comprising sets of instructions for:
    maintaining a first set of forwarding state data that represents a forwarding state of the first set of forwarding elements;
    receiving a second set of forwarding state data that represents a forwarding state of a second set of forwarding elements from a second controller instance;
    propagating the first set of forwarding state data to the first set of forwarding elements;
    upon detecting a failure of the second controller instance, merging the second set of forwarding state data into the first set of forwarding state data to produce a third set of forwarding state data; and
    propagating the third set of forwarding state data to the first and second sets of forwarding elements.

2. The machine-readable medium of claim 1, wherein the set of instructions for maintaining the first set of forwarding state data comprises a set of instructions for calculating the first set of forwarding state data for managing the first set of forwarding elements based on a fourth set of forwarding state data received from a third controller instance.

3. The machine-readable medium of claim 2, wherein the program further comprises a set of instructions for receiving a fifth set of forwarding state data for managing the second set of forwarding elements from the second controller instance.

4. The machine-readable medium of claim 3, wherein the program further comprises a set of instructions for merging the fifth set of forwarding state data into the first and second sets of forwarding state data.

5. The machine-readable medium of claim 1, wherein the program further comprises a set of instructions for storing the second set of forwarding state data separately from the first set of forwarding state data.

6. The machine-readable medium of claim 1, wherein the first set of forwarding elements comprises at least one particular forwarding element of the second set of forwarding elements.

7. The machine-readable medium of claim 6, wherein the set of instructions for merging comprises sets of instructions for:
    identifying a first portion of the first set of forwarding data related to the particular forwarding element that corresponds to a second portion of the second set of forwarding data related to the particular forwarding element;
    determining whether the first portion is newer than the second portion; and
    when the first portion is newer, replacing the second portion with the first portion.

8. The machine-readable medium of claim 1, wherein the logical datapath sets are logical forwarding elements, wherein the first and third sets of forwarding state data are for implementing the logical forwarding elements on a set of physical forwarding elements.

9. The machine-readable medium of claim 1, wherein the first controller instance is a master controller for the first set of forwarding elements and a backup controller for the second set of forwarding elements, and the second controller instance is a master controller for the second set of forwarding elements.

10. For a first controller instance that manages a first set of forwarding elements implementing logical datapath sets of a network control system, a machine-readable medium storing a program executable by at least one processing unit of the first controller instance, the program comprising sets of instructions for:
    generating, from a first set of input tuples for a first logical datapath set, a first set of output tuples;
    receiving a second set of input tuples for a second logical datapath set from a second controller instance that manages a second set of forwarding elements;
    propagating the first set of output tuples to the first set of forwarding elements in order to define a first state for the first logical datapath set, wherein the first state comprises a set of forwarding rules to implement the first logical datapath set;
    upon detecting a failure of the second controller instance, generating, from the first and second sets of input tuples, a second set of output tuples while maintaining the first state for the first logical datapath set; and upon completion of said generating, propagating the second set of output tuples to the first and second sets of forwarding elements in order to define a second state for the first and second logical datapath sets.

11. The machine-readable medium of claim 10, wherein the set of instructions for generating the first set of output tuples for the first logical datapath set comprises a set of instructions for, upon detecting a failure of the second controller instance, disabling changes to a set of head tables, wherein contents of the head tables represent the first state.

12. The machine-readable medium of claim 11, wherein the set of instructions for propagating the second set of output tuples comprises a set of instructions for re-enabling changes to the set of head tables.

13. The machine-readable medium of claim 10, wherein the set of instructions for generating the second set of output tuples comprises a set of instructions for merging the second set of input tuples with the first set of input tuples.

14. The machine-readable medium of claim 13, wherein the set of instructions for merging the second set of input tuples comprises sets of instructions for:
   identifying a first portion of the first set of input tuples that corresponds to a second portion of the second set of input tuples;
   determining whether the second portion is newer than the first portion; and
   when the second portion is newer than the first portion, replacing the first portion of the first set of input tuples with the second portion of the second set of input tuples.

15. The machine-readable medium of claim 10, wherein the second set of input tuples is received from the second controller when processing at the second controller reaches a fixed point.

16. The machine-readable medium of claim 10, wherein the second logical datapath set comprises at least one logical datapath of the first logical datapath set.

17. The machine-readable medium of claim 10, wherein the program further comprises sets of instructions for:
   storing the second set of input tuples separately from the first set of input tuples.

18. For a first controller instance that manages a first set of forwarding elements implementing logical datapath sets of a network control system, a method comprising:
   generating, from a first set of input tuples for a first logical datapath set, a first set of output tuples;
   receiving a second set of input tuples for a second logical datapath set from a second controller instance that manages a second set of forwarding elements;
   propagating the first set of output tuples to the first set of forwarding elements in order to define a first state for the first logical datapath set, wherein the first state comprises a set of forwarding rules to implement the first logical datapath set;
   upon detecting a failure of the second controller instance, generating, from the first and second sets of input tuples, a second set of output tuples while maintaining the first state for the first logical datapath set; and
   upon completion of said generating, propagating the second set of output tuples to the first and second sets of forwarding elements in order to define a second state for the first and second logical datapath sets.

19. The method of claim 18, wherein generating the first set of output tuples for the first logical datapath set comprises, upon detecting a failure of the second controller instance, disabling changes to a set of head tables, wherein contents of the head tables represent the first state.

20. The method of claim 18, wherein generating the second set of output tuples comprises merging the second set of input tuples with the first set of input tuples.

* * * * *